United States Patent
Li

(10) Patent No.: US 12,483,760 B2
(45) Date of Patent: Nov. 25, 2025

(54) DISPLAY APPARATUS, AND METHOD FOR DISPLAYING TIME ZONE INFORMATION

(71) Applicant: HISENSE VISUAL TECHNOLOGY CO., LTD., Qingdao (CN)

(72) Inventor: Xianqi Li, Qingdao (CN)

(73) Assignee: HISENSE VISUAL TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 18/899,252

(22) Filed: Sep. 27, 2024

(65) Prior Publication Data

US 2025/0024112 A1 Jan. 16, 2025

Related U.S. Application Data

(63) Continuation of application No. PCT/CN2023/084607, filed on Mar. 29, 2023.

(30) Foreign Application Priority Data

Apr. 8, 2022 (CN) .......................... 202210369229.7
May 11, 2022 (CN) .......................... 202210513611.0

(51) Int. Cl.
*H04N 21/485* (2011.01)
*H04N 21/431* (2011.01)

(52) U.S. Cl.
CPC ....... *H04N 21/485* (2013.01); *H04N 21/4316* (2013.01)

(58) Field of Classification Search
CPC ............. H04N 21/485; H04N 21/4316; H04N 21/431; H04N 21/439; G06F 3/16
See application file for complete search history.

(56) References Cited

U.S. PATENT DOCUMENTS

| 6,412,111 B1 | 6/2002 | Cato | |
| 2001/0010671 A1* | 8/2001 | Ando | G11B 27/034 369/47.28 |

(Continued)

FOREIGN PATENT DOCUMENTS

| CN | 105681821 A | 6/2016 |
| CN | 106126168 A | 11/2016 |

(Continued)

OTHER PUBLICATIONS

The World Intellectual Property Organization (WIPO) International Search Report for PCT/CN2023/084607 Jul. 7, 2023 6 Pages (including translation).

*Primary Examiner* — Oschta I Montoya
(74) *Attorney, Agent, or Firm* — ANOVA LAW GROUP, PLLC

(57) ABSTRACT

Provided in the present application are a display apparatus, and a method for displaying time zone information. The display apparatus detects a signal source of the display apparatus when the display apparatus is powered on; when the signal source is a first channel, determines whether a code stream exists in the first channel; when a code stream exists in the first channel, parses the code stream to obtain first time information; when the first time information includes first time zone information, the first UTC time and the first daylight saving time, determines a first offset time corresponding to the first time zone information, and sums the first offset time, the first UTC time and the first daylight saving time to obtain a current time.

10 Claims, 19 Drawing Sheets

(56) References Cited

U.S. PATENT DOCUMENTS

| | | | | |
|---|---|---|---|---|
| 2006/0156342 A1* | 7/2006 | Xiao | ............... | H04N 21/47 |
| | | | | 725/50 |
| 2008/0032736 A1* | 2/2008 | Bari | ............... | H04W 12/06 |
| | | | | 455/552.1 |
| 2015/0256874 A1* | 9/2015 | Kim | ............... | H04N 21/4627 |
| | | | | 725/151 |

FOREIGN PATENT DOCUMENTS

| | | | |
|---|---|---|---|
| CN | 106201420 | A | 12/2016 |
| CN | 107493499 | A | 12/2017 |
| CN | 108462895 | A | 8/2018 |
| CN | 111010597 | A | 4/2020 |
| CN | 111552452 | A | 8/2020 |
| CN | 111601134 | A | 8/2020 |
| CN | 111988648 | A | 11/2020 |
| CN | 112584229 | A | 3/2021 |

\* cited by examiner

DISPLAY APPARATUS, AND METHOD FOR DISPLAYING TIME ZONE INFORMATION

CROSS REFERENCE TO RELATED APPLICATIONS

The application a continuation of International Application No. PCT/CN2023/084607, which claims the priority to Chinese Patent Application No. 202210369229.7 filed on Apr. 8, 2022, and the priority to Chinese Patent Application No. 202210513611.0 filed on May 11, 2022, all of which are incorporated herein in their entireties by reference.

TECHNICAL FIELD

The present application relates to the technical field of intelligent display apparatuses, and in particular to a display apparatus, and a method for displaying time zone information.

BACKGROUND

A display apparatus refers to the terminal equipment that can output a specific display image, which can be a smart television, a mobile terminal, an intelligent advertising screen, a projector or the like. Taking the smart television as an example, the smart television is a television product that is based on an Internet application technology, has an open operating system and chip, has an open application platform, and can realize two-way human-computer interaction. The smart television integrates audio and video, entertainment, data and other functions, to satisfy diversified and personalized needs of users.

The display apparatus plays an audio stream through an audio device, such as playing an audio stream through a built-in audio device, such as a loudspeaker, or playing an audio stream through an external audio device, such as a Bluetooth stereo. The display apparatus performs sound effect processing on the audio stream to improve the playback quality of the audio stream. However, sound effect parameters used by the display apparatus to perform the sound effect processing on the audio stream are matched only with the built-in audio device, and cannot be matched with the external audio device, resulting in that when the audio stream after the sound effect processing is outputted by the external audio device, the playback quality of the audio stream still cannot be guaranteed, thereby failing to bring into play the playback effect of the external audio device, and affecting an auditory experience of a user when the user plays the audio stream using the external audio device.

SUMMARY

The present application provides a display apparatus, and the display apparatus can include: a display configured to display an image from a broadcast system or network and/or a user interface; a modem; a communication device configured to communicate with an external device; a user input interface configured to receive an input signal; and at least one processor in connection with the display, the modem, the communication device and the user input interface and configured to execute instructions to cause the display apparatus to: detect a signal source of the display apparatus when the display apparatus is powered on; based on that the signal source is a first channel, determine whether a code stream exists in the first channel; based on that a code stream exists in the first channel, parse the code stream to obtain first time information, where the first time information includes first time zone information, a first Universal Time Coordinated (UTC) time and a first daylight saving time, or the first time information includes first time zone information and a first UTC time; where the first channel is a Digital Television (DTV) channel; based on that the first time information includes the first time zone information, the first UTC time and the first daylight saving time, determine a first offset time corresponding to the first time zone information, and sum the first offset time, the first UTC time and the first daylight saving time, to obtain a current time; based on that the first time information includes the first time zone information and the first UTC time, determine a first offset time corresponding to the first time zone information, and sum the first offset time and the first UTC time, to obtain a current time.

The present application provides a method for displaying time zone information, and the method can include: detecting a signal source of a display apparatus when the display apparatus is powered on; based on that the signal source is a first channel, determining whether a code stream exists in the first channel; based on that a code stream exists in the first channel, parsing the code stream to obtain first time information, where the first time information includes first time zone information, a first UTC time and a first daylight saving time, or the first time information includes first time zone information and a first UTC time; where the first channel is a DTV channel; based on that the first time information includes the first time zone information, the first UTC time and the first daylight saving time, determining a first offset time corresponding to the first time zone information, and summing the first offset time, the first UTC time and the first daylight saving time, to obtain a current time; based on that the first time information includes the first time zone information and the first UTC time, determining a first offset time corresponding to the first time zone information, and sum the first offset time and the first UTC time, to obtain a current time.

DETAILED DESCRIPTION

Embodiments will be described in detail below, with examples shown in the accompanying drawings. When the following description relates to the accompanying drawings, the same numerals in the different accompanying drawings indicate the same or similar elements unless otherwise indicated. The implementations described in the following embodiments do not represent all embodiments according to the present application. They are only examples of systems and methods according to some aspects of the present application as detailed in the claims.

Figure 1:
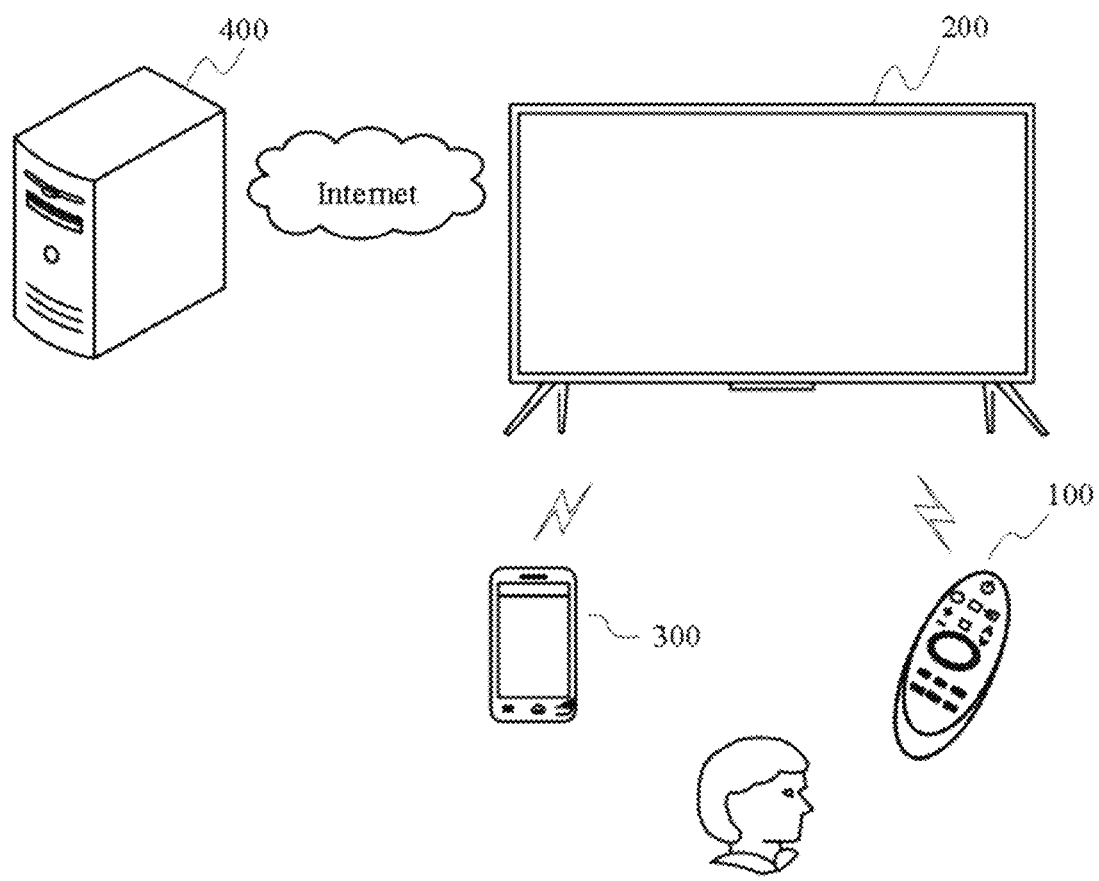
FIG. 1 shows a use scenario of a display apparatus according to some embodiments of the present application.
Figure 2:
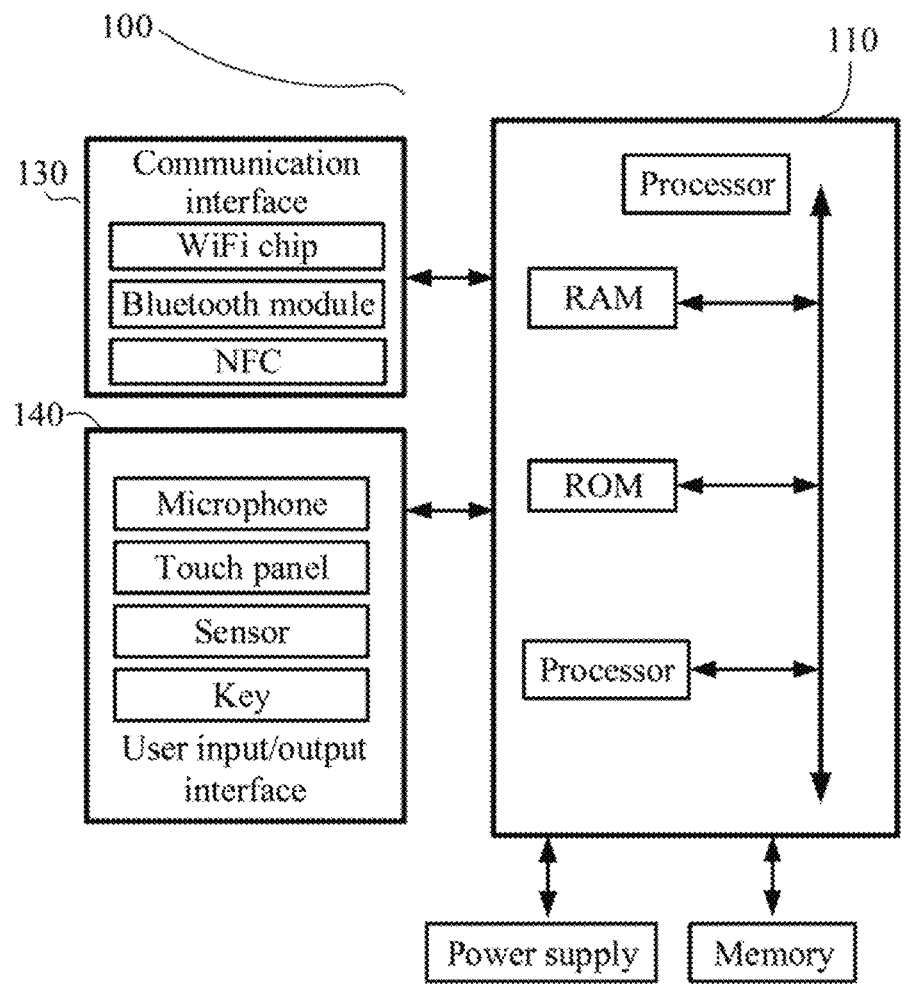
FIG. 2 is a block diagram of configuration of a control device according to some embodiments of the present application.

A display apparatus according to the implementations of the application may have various implementation forms, for example, a smart television, a laser projection device, a monitor, an electronic bulletin board and an electronic table, etc., or a cell phone, a tablet computer, a smart watch and other devices with display screens. FIG. 1 and FIG. 2 are specific implementations of the display apparatus of the application.

FIG. 1 is a schematic diagram of an operation scenario between a display apparatus and a control device according to some embodiments of the disclosure. As shown in FIG. 1, a user may operate the display apparatus 200 through a smart device 300 or the control device 100.

In some embodiments, the control device 100 may be a remote control, and communication between the remote control and the display apparatus can include at least one of infrared protocol communication or Bluetooth protocol communication, and other short-distance communication modes. The display apparatus 200 can be controlled in a wireless or wired mode. The user may control the display apparatus 200 by inputting a user command through keys on the remote controller, voice input, control panel input, etc.

In some embodiments, the display apparatus 200 may be further controlled with the smart device 300 (such as a mobile terminal, a tablet computer, a computer and a notebook computer). For example, the display apparatus 200 can be controlled with an application running on the smart device 300.

In some embodiments, the display apparatus 200 can further communicate data with a server 400. The display apparatus 200 may be allowed to communicate through a local area network (LAN), a wireless local area network (WLAN) and other networks. The server 400 may provide all types of contents and interactions for the display apparatus 200.

The server 400 may be a cloud server providing various services, such as storing configuration files provided by manufacturers of various external audio devices, storing data corresponding to user accounts, and providing support services for the data collected by the display apparatus 200, etc.

FIG. 2 is a block diagram of configuration of a control device 100 according to some embodiments of the disclosure. As shown in FIG. 2, the control device 100 can include a processor 110, a communication interface 130, a user input/output interface 140, a memory and a power supply. The control device 100 may receive an operation command input by the user, and convert the operation command into a recognizable instruction to which the display apparatus 200 may respond, to play an interactive intermediary role between the user and the display apparatus 200.

Figure 3:
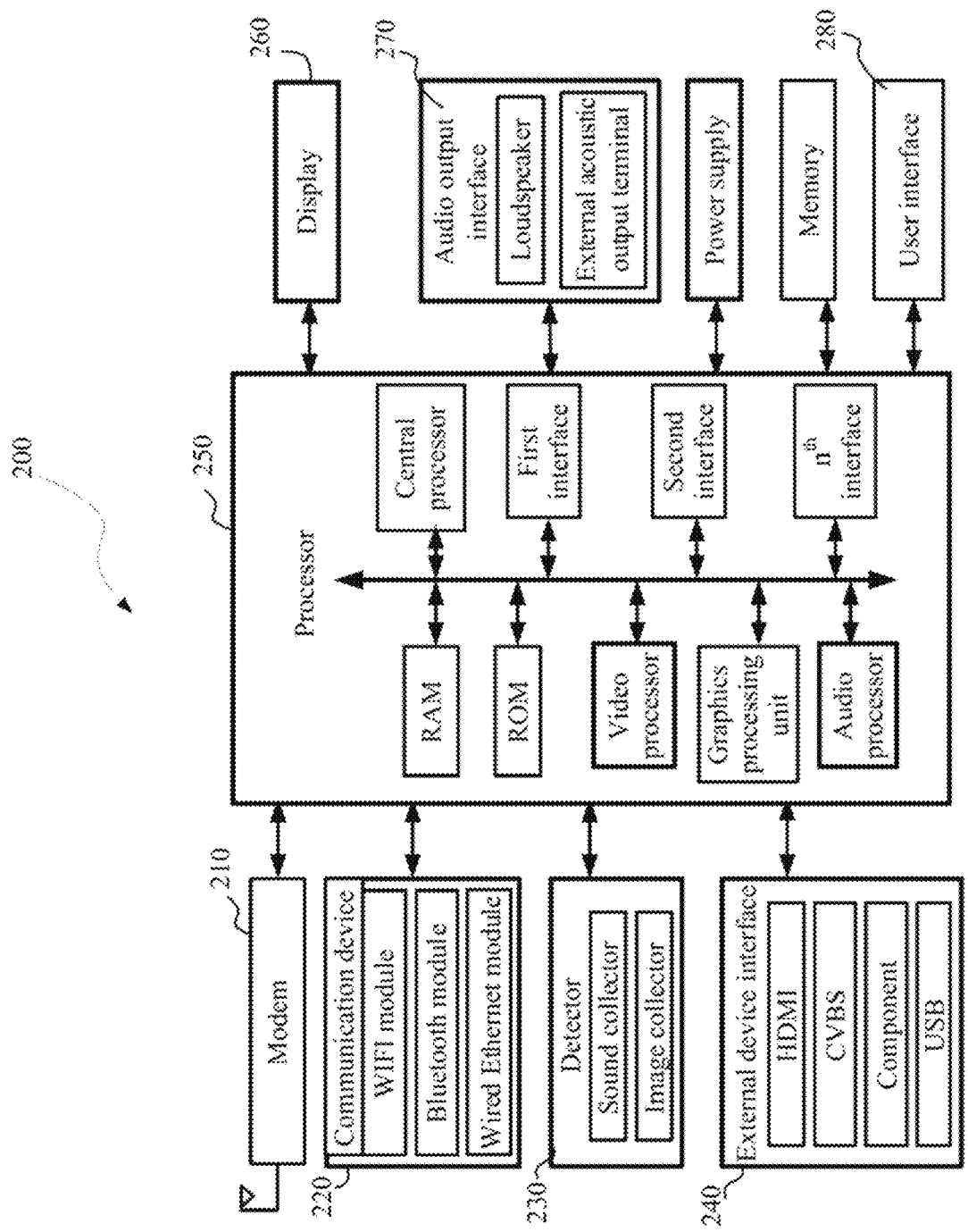
FIG. 3 is a configuration diagram of a display apparatus according to some embodiments of the present application.

FIG. 3 illustrates a block diagram of configuration of the display apparatus 200 according to exemplary embodiments.

The display apparatus 200 can include at least one of a modem 210, a communication device 220, a detector 230, an external device interface 240, a processor 250, a display 260, an audio output interface 270, a memory, a power supply, and a user interface.

In some embodiments, the modem 210 can receive a broadcast television signal in a wired or wireless reception mode, and demodulate audio and video signals, such as an electronic program guide (EPG) data signal, from a plurality of wireless or wired broadcast television signals.

In some embodiments, the communication device 220 can be a component for communicating with an external device or a server according to various types of communication protocols. For example, the communication device may include at least one of a WiFi module, a Bluetooth module, a wired Ethernet module and other network communication protocol chips or near-field communication protocol chips, as well as an infrared receiver. The display apparatus 200 may establish transmission and reception of a control signal and a data signal with the control device 100 or the server 400.

In some embodiments, the detector 230 may be configured to collect signals of an external environment or interaction with the outside. For example, the detector 230 can include an optical receiver, a sensor for collecting an ambient light intensity. Alternatively, the detector 230 can include an image collector, such as a camera, which may be configured to collect an external environment scenario, an attribute of the user or an interaction gesture of the user. Alternatively, the detector 230 can include a sound collector, such as a microphone, for receiving external sounds.

The sound collector may be a microphone, also known as a "mouthpiece" or "mike", which may be used to receive the user's voice and convert the sound signal into an electrical signal. The display apparatus 200 may be provided with at least one microphone. In other embodiments, the display apparatus 200 may be provided with two microphones, which may reduce noise in addition to collecting sound signals. In other embodiments, the display apparatus 200 may also be provided with three, four, or more microphones to collect sound signals, reduce noise, identify sound sources, and achieve a directional recording function, etc.

In addition, the microphone(s) may be built into the display apparatus 200, or the microphone(s) may be connected to the display apparatus 200 by a wired or wireless manner. Of course, the location of the microphone(s) on the display apparatus 200 cannot be limited in the embodiments of the present application. Alternatively, the display apparatus 200 may not include a microphone, i.e., the microphone(s) described above is not provided in the display apparatus 200. The display apparatus 200 may be connected to an external microphone (which may also be referred to as a mike) via an interface (e.g., a universal serial bus (USB) interface 130). This external mike may be fixed to the display apparatus 200 by an external fixing member (e.g. a camera mount with a clip).

In some embodiments, the external device interface 240 may include but not limited to: any one or more of a high-definition multimedia interface (HDMI), an analog or data high-definition component input interface (component), a composite video broadcast signal (CVBS), a USB input interface, an RGB port or the like. It may also be a composite input/output interface formed by the plurality of above interfaces.

In some embodiments, the processor 250 and the modem 210 may be located in individual devices, that is, the modem 210 may also be located in an external device of a main device where the processor 250 is located, for example, an external set-top-box and the like.

In some embodiments, the processor 250 can control work of the display apparatus and respond to an operation from the user through various software programs stored in the memory. The processor 250 can control overall operation of the display apparatus 200. For example, in response to receiving a user command for selecting an object presented on a user interface on the display 260, the processor 250 may execute an operation related to the object selected by the user command.

In some embodiments, the processor 250 can include at least one of a Central Processing Unit (CPU), a video processor, an audio processor, a Graphics Processing Unit (GPU), a Random Access Memory (RAM), a Read-Only Memory (ROM), a first interface to an $n^{th}$ interface used for inputting/outputting, a communication bus or the like.

In some embodiments, the display 260 can include a display screen component configured to present a picture, a driving component configured to drive image displaying, a component configured to receive an image signal output from the processor 250 to display the video content, the image content and a menu operation interface, a user operation UI and the like.

The display 260 may be a liquid crystal display, an Organic Light-Emitting Diode (OLED) display, or a projection display, or may also be a projection device and a projection screen.

In some embodiments, the user may input the user command on a Graphical User Interface (GUI) displayed on the display 260, and the user input interface can receive the input user command through the GUI. Alternatively, the user may input the user command by inputting a specific sound or gesture, and the user input interface can recognize the sound or gesture through a sensor to receive the input user command.

Figure 4:
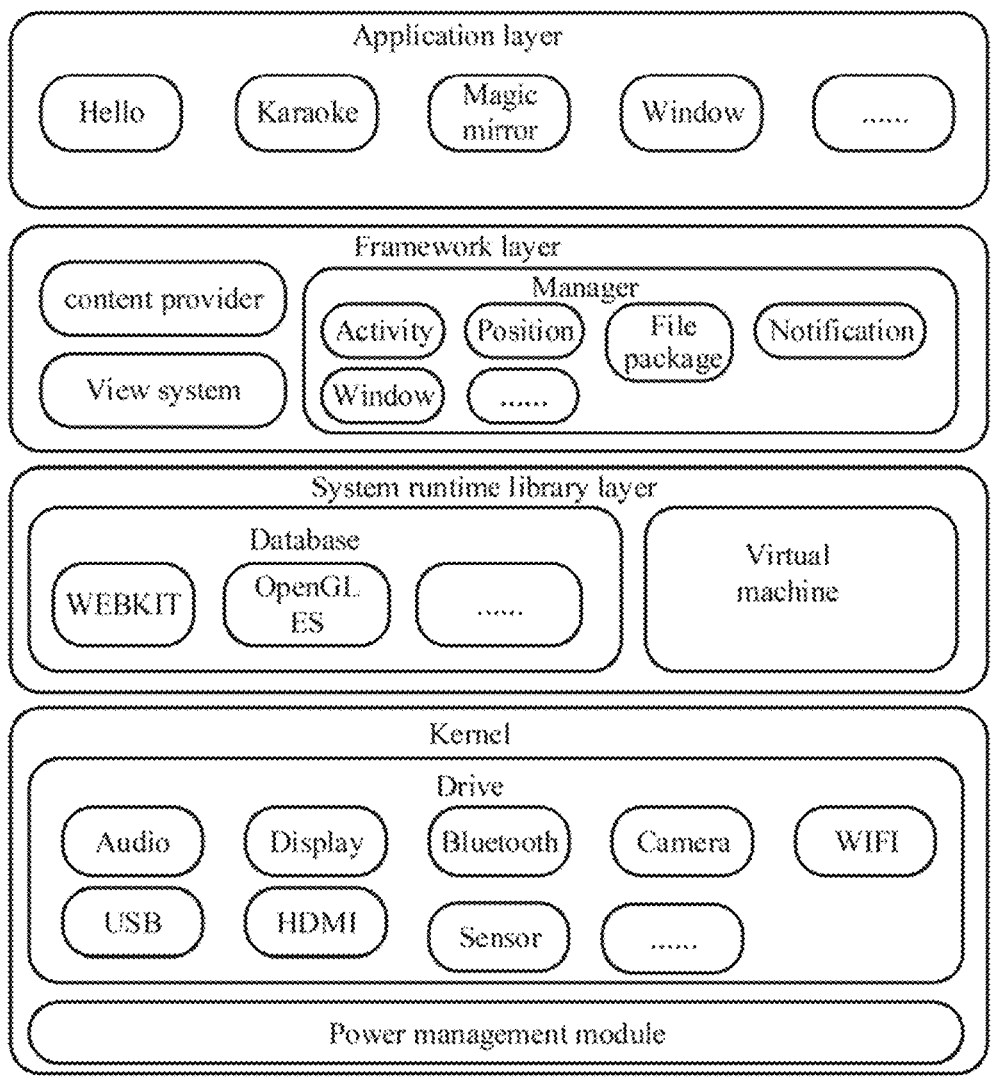
FIG. 4 is a configuration diagram of an operating system of a display apparatus according to some embodiments of the present application.

Referring to FIG. 4, in some embodiments, the system can be divided into four layers, which are an application layer, an application framework layer ("framework layer" for short), an Android runtime and system library layer (system run library layer), and a kernel layer from top to bottom.

In some embodiments, at least one application can be run in the application layer, and these applications may be a window application, a system set program or a clock application and the like carried in the operating system; or may be an application developed by a third party developer. During specific implementations, the applications in the application layer can include but not limited to the above examples.

The application framework layer can provide an application programming interface (API) and a programming framework for the applications in the application layer. The application framework layer can include some predefined functions. The application framework layer can function like a processing center, which causes applications in the application layer to take an action. The applications, through API interfaces, may access resources in the system run library layer and obtain services of the system, call the corresponding drivers in the kernel layer to drive the corresponding modules to use the corresponding resources to execute the corresponding services.

In some embodiments, the system run library layer can provide support for an upper layer, namely the framework layer, and when the framework layer is used, the Android operating system may run a C/C++ library contained in the system run library layer so as to realize functions implemented by the framework layer.

In some embodiments, the kernel layer can be a layer between hardware and software. As shown in FIG. 4, the kernel layer can at least include at least one of the following drivers: an audio driver, a display driver, a Bluetooth driver, a camera driver, a WIFI driver, a USB driver, an HDMI driver, a sensor driver (for example, a fingerprint sensor, a temperature sensor, a pressure sensor and the like), a power management module and the like.

The display apparatus 200 can play the audio stream via an audio device. In the embodiments, the audio device can include a built-in audio device, which is an audio device configured in the display apparatus 200 itself for playing the audio stream, such as a loudspeaker as shown in FIG. 3. The audio device also can include an external audio device (hereinafter referred to as an audio peripheral), and the audio peripheral can refer to an audio device that is connected through an interface or a communication module provided by the display apparatus 200. For example, as shown in FIG. 3, the audio peripheral can be an audio peripheral that is connected to the display apparatus 200 via the communication device 220, such as an audio peripheral that is connected to the display apparatus 200 based on a WiFi network via a WiFi module of the display apparatus 200, an audio peripheral (subsequently referred to as a Bluetooth audio peripheral) that is connected to the display apparatus 200 based on Bluetooth communication via a Bluetooth module of the display apparatus 200, and an audio peripheral that is connected to the display apparatus 200 based on Ethernet communication via the wired Ethernet module of the display apparatus 200. For another example, as shown in FIG. 3, the audio peripheral can be an audio peripheral that is connected to the display apparatus 200 via an external device interface 240, such as an audio device wired to the display apparatus 200 via a USB interface of the display apparatus 200 (subsequently referred to as a USB audio peripheral), an audio peripheral (subsequently referred to as a 12S audio peripheral) that is connected to the display apparatus 200 via a 12S digital audio output interface (not shown in the figures), and an audio peripheral (subsequently referred to as an ARC audio peripheral) that is connected to the display apparatus 200 via an Audio Return Channel (ARC) interface (not shown in the figures). For another example, as shown in FIG. 3, the audio peripheral can be an audio peripheral (subsequently referred to as a wired audio peripheral) that is wired to the display apparatus 200 via an audio output interface 270, such as an external stereo, or a wired headset. In some embodiments, the audio peripheral can be an audio peripheral (subsequently referred to as a fiber optic audio peripheral) that is connected to the display apparatus 200 via fiber optics (not shown in the figures).

As shown in FIG. 3, the display apparatus 200 can demodulate the received audio stream through the modem 210, and input the demodulated audio stream into the audio processor for processing. In order to improve the playback quality of the audio stream, the audio stream is usually subjected to sound effect processing. In the embodiments, performing sound effect processing on the audio stream is to set corresponding sound effect parameters for the audio stream. The sound effect parameters can include a sound mode such as a dynamic mode and a standard mode, etc., a surround sound, sound resetting, a bass emphasis, an equalizer, and a Dolby audio, as well as a corresponding numerical value for each item. The audio stream that has been subjected to sound effect processing can be transmitted to the currently used audio device for playing. However, the sound effect parameters used by the display apparatus 200 for performing sound effect processing on the audio stream are matched only with the built-in audio device, and cannot be matched with the audio peripheral, for example, the items in the sound effect parameters do not match the items in the sound effect parameters corresponding to the audio peripheral, and the numerical values of the sound effect parameters do not match the numerical values of the sound effect parameters corresponding to the audio peripheral. As a result, when the audio stream after sound effect processing is output through the audio peripheral, the playback quality of the audio stream still cannot be guaranteed, so that the playback effect of the external audio device cannot be fully utilized, affecting the user's listening experience when playing the audio stream using the audio peripheral.

Figure 5:
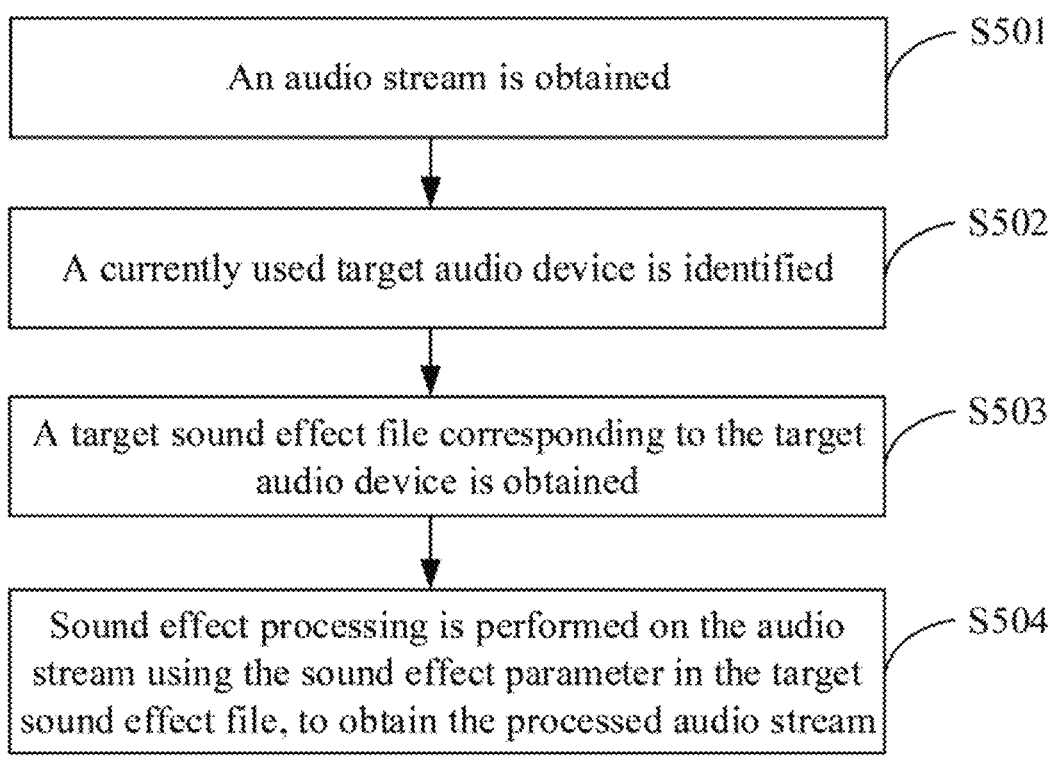
FIG. 5 is a schematic diagram of a flow of setting sound effect parameters according to some embodiments of the present application.

In order to solve the above problem, embodiments of the present application can provide a display apparatus and a processing method for the display apparatus. The processing method can include a sound effect setting method for an audio device, so that when performing sound effect processing on an audio stream output to a built-in audio device of the display apparatus and an external audio device, corresponding sound effect parameters can be used respectively, and the processed audio stream can be matched with the corresponding audio device, thereby ensuring the playback quality of the audio stream. The playback quality of the audio stream can be guaranteed. Referring to the process shown in FIG. 5, the sound effect setting method of the audio device can include S501~S504, with the following specific steps.

S501, An audio stream is obtained.

The audio stream may be live audio data, such as the display apparatus 200 receives the audio stream through antennas. The audio stream may be local audio data, such as audio data is stored in a memory of the display apparatus 200, and the display apparatus 200 can obtain the audio stream directly from the memory. The audio stream may be audio data provided by an external device. The external device can be a device that is connected to the display apparatus 200 via an interface or communication module provided by the display apparatus 200 and transmits audio data to the display apparatus 200. As shown in FIG. 3, the external device may be connected to the display apparatus 200 via a communication device 220 or an external device interface 240. For example, the external device can be connected to the display apparatus 200 via a WiFi network, and the display apparatus 200 can receive the audio stream transmitted by the external device based on the WiFi network. The external device can be connected to the display apparatus 200 via Bluetooth, and the display apparatus 200 can receive the audio stream transmitted by the external device based on Bluetooth communication. The external device can be connected to the display apparatus 200 via Ethernet, and the display apparatus 200 can receive the audio stream transmitted by the external device based on Ethernet. The external device can be connected to the display apparatus 200 via the USB, and the display apparatus 200 can receive the audio stream transmitted by the external device based on the USB interface. The audio stream may be audio data acquired by the display apparatus 200 from the external environment. As shown in FIG. 3, the display apparatus 200 can acquire the surrounding audio stream through a detector 230, such as a sound collector.

Figure 6:
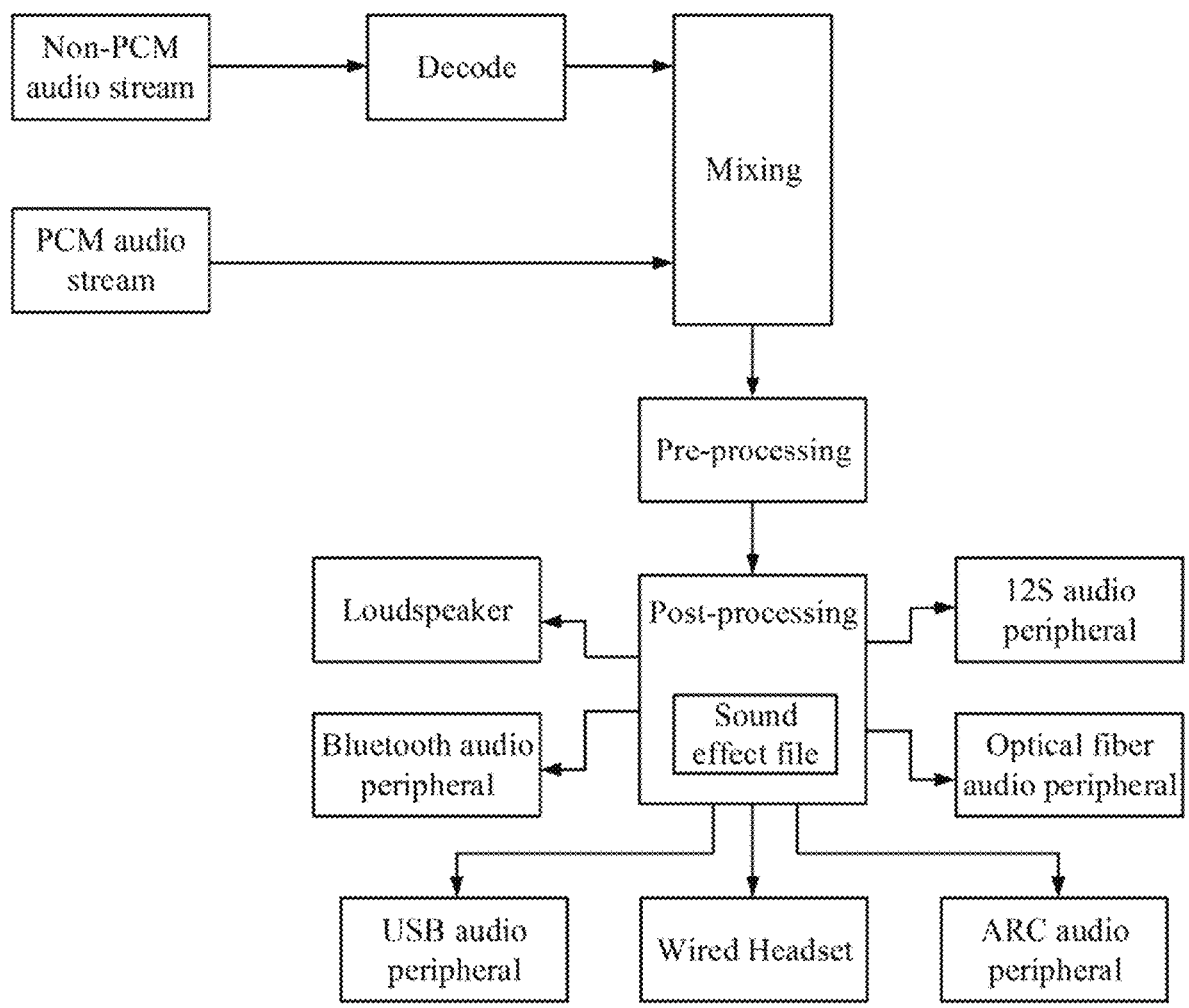
FIG. 6 is a schematic diagram of a flow of processing an audio stream according to some embodiments of the present application.

Referring to a flowchart of processing an audio stream shown in FIG. 6. After acquiring the audio stream, the display apparatus 200 can first process the audio stream in a unified format. According to the coding format, the audio streams can be classified into Pulse Code Modulation (PCM) format audio streams, such as a Waveform Audio Format (WAV) audio stream, and non-PCM format audio streams, such as a lossless compressed audio format (APE) audio stream, and a Free Lossless Audio Codec format (FLAC) audio stream. The non-PCM format audio streams can be decoded to obtain PCM format audio streams, and all the PCM format audio streams are subjected to mixing processing, i.e., a sampling rate, a bit rate and the like of each PCM format audio stream are optimized to obtain an audio stream having a specified format. In some embodiments, the specified format may be a 48 kHz sampling rate and a 32-bit bit rate.

The audio stream after the mixing process can be subjected to pre-processing, i.e., volume gain processing can be performed on the audio stream after the mixing process to amplify a volume of the audio stream after the mixing process, so as to facilitate the subsequent sound effect processing of the audio stream after the mixing process and ensure a playing effect of the audio stream after the mixing process.

The audio stream after the pre-processing can be subjected to post-processing, i.e., the audio stream after the pre-processing can be subjected to sound effect post-processing. The audio stream after the pre-processing can be subjected to the sound effect processing by using the sound effect parameters in the sound effect file. For example, the sound effect parameters in the sound effect file are in a standard mode, and the various values of the equalizer are respectively −4 dB, −1 dB, 2 dB, 2 dB, and −3 dB, which respectively correspond to bass band, bass-middle band, middle-band, middle-high band, and high band. Then the audio stream obtained after the sound effect processing of the pre-processed audio stream by using the sound effect file has sound effect parameters corresponding to the above values.

The post-processed audio stream can be transmitted to the currently used audio device and played. For example, the post-processed audio stream is transmitted to a built-in audio device, such as a loudspeaker, for playing; or, the post-processed audio stream is transmitted to an audio peripheral, such as a user-specified Bluetooth stereo, for playing.

Only when the sound parameters of the audio stream after sound effect processing match the currently used audio device, can the playback quality of the audio stream be guaranteed. As can be seen from the processing flow of the audio stream described above, the sound effect parameters of the audio stream after the sound effect processing correspond to the sound effect file used in the sound effect post-processing. Therefore, in order to ensure the playback quality of the audio stream, it is necessary to ensure that the sound effect file used in the sound effect processing accurately matches the currently used audio device.

In the embodiments, in order to realize that the sound effect file used accurately matches the currently used audio device, the sound effect file can be reconfigured, i.e., different sound effect files are set for different audio devices. The sound effect parameters in the sound effect file corresponding to each audio device match the audio device. In the sound effect processing, the sound effect file corresponding to the currently used audio device is used, which can ensure that the audio stream after sound effect processing has sound effect parameters matching the audio device, thereby ensuring the playback quality of the audio stream.

The following are embodiments 1 to 4 for illustrating how to set different sound effect files for different audio devices in the present application.

In embodiment 1, audio devices can be classified according to sources of corresponding output audio streams, and each type of audio devices can correspond to one sound effect file.

In the embodiment, the audio streams output by a built-in audio device and a first audio peripheral can belong to the same source, and the audio stream output by a second audio peripheral can belong to another source. The first audio peripheral refers to an audio peripheral connected to the display apparatus 200 via a first communication mode, for example, a Bluetooth audio peripheral, a USB audio peripheral, and a wired headset as disclosed above; and the second audio peripheral refers to an audio peripheral connected to the display apparatus 200 via a second communication mode, for example, an optical fiber audio peripheral, an ARC audio peripheral and a 12S audio peripheral as disclosed above.

Figure 7:
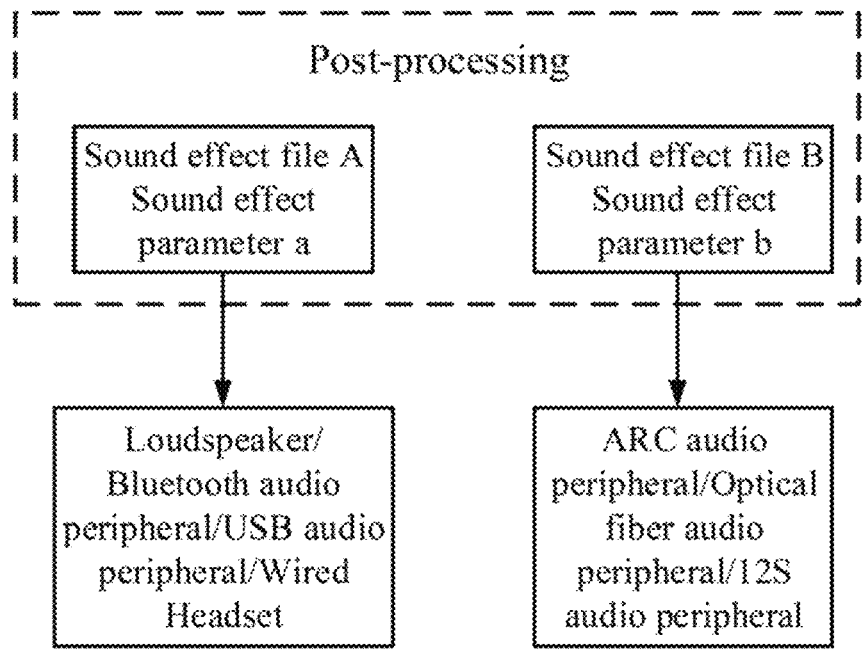
FIG. 7 is a schematic diagram of a correspondence between a sound effect file and an audio device according to some embodiments of the present application.

As shown in FIG. 7, the same sound effect file can be configured for the built-in audio device (e.g., a loudspeaker) and the first audio peripheral, e.g., a sound effect file A, and the sound effect file A contains a sound effect parameter a; and the same sound effect file is configured for the second audio peripheral, e.g., a sound effect file B, and the sound effect file B contains a sound effect parameter b. Audio streams belonging to the same source are subjected to the sound effect processing with sound effect parameters that are relatively close to each other, and thus the processed audio stream obtained by using the same group of sound effect parameters to perform sound effect processing of the audio streams from the same source can be adapted to the audio device that plays the audio stream from the source, and the playback quality of the audio stream can be ensured. The sound effect file corresponding to each type of audio devices can be pre-stored in a memory of the display apparatus 200. Configuring the sound effect files in the manner described above not only ensures the playback quality of the audio stream, but also effectively controls the number of pre-stored sound effect files, thereby reducing the memory space of the memory occupied by the sound effect files. Moreover, it is also convenient to quickly determine the sound effect file corresponding to the currently used audio device among a smaller number of sound effect files, which can improve the efficiency of sound effect processing.

In some embodiments, the sound effect parameter a in the sound effect file A adopts a sound effect parameter that originally matches the built-in audio device. As a result, the sound effect parameter a may directly follow a sound effect parameter configured for the built-in audio device by the display apparatus 200 at the time of leaving the factory, and there is no need to additionally obtain sound effect parameters corresponding to other first audio peripheral devices. That is, the sound effect file A may directly follow an original sound effect file in the display apparatus 200, which may save the work of configuring the sound effect file A, and only the sound effect file B needs to be configured.

In some embodiments, the sound effect parameter b in the sound effect file B may adopt a sound effect parameter that matches any of the second audio peripherals, such as adopting a sound effect parameter that matches an ARC audio peripheral.

In some embodiments, the sound effect parameter b in the sound effect file B may adopt a specified sound effect parameter, which is calculated based on sound effect parameters corresponding to various second audio peripherals. As a result, the specified sound effect parameter does not precisely match a certain second audio peripheral, but can better match the various second audio peripherals, so that the playback quality of the audio stream processed by using the specified sound effect parameter does not have a large gap in the various second audio peripherals, and the playback quality of the various second audio peripherals can be balanced. For example, a phenomenon in which the playback quality of some second audio peripherals is obviously better and the playback quality of some second audio peripherals is obviously worse can be avoided when a user uses the various second audio peripherals. For another example, when a user switches the various second audio peripherals, a sudden change in the sound quality can be avoided, which affects the user's listening experience.

In embodiment 2, based on embodiment 1, various types of audio devices classified according to sources of the corresponding output audio streams can further be classified according to device types of the audio devices, and each type of audio devices can correspond to one sound effect file.

In the embodiment, a device type of the audio device can correspond to the communication mode between the audio device and the display apparatus 200. As can be seen above, the device types of the audio devices can include a built-in audio device, a Bluetooth audio peripheral, a USB audio peripheral, a wired headset, an ARC audio peripheral, an optical fiber audio peripheral, and a 12S audio peripheral.

In the embodiment, the built-in audio device of the display apparatus 200 and the external audio device may be further classified. That is, according to the device types, the built-in audio device and the first audio peripherals can further be classified into two categories of built-in audio device and first audio peripheral. Since the second audio peripherals are all audio peripherals, there is no need to further categorize the second audio peripherals. As a result, the audio devices obtained after further categorization can correspond to three categories, i.e., the built-in audio device, the first audio peripheral and the second audio peripheral. The built-in audio device corresponds to one sound effect file, the first audio peripheral corresponds to one sound effect file, and the second audio peripheral corresponds to one sound effect file.

Figure 8:
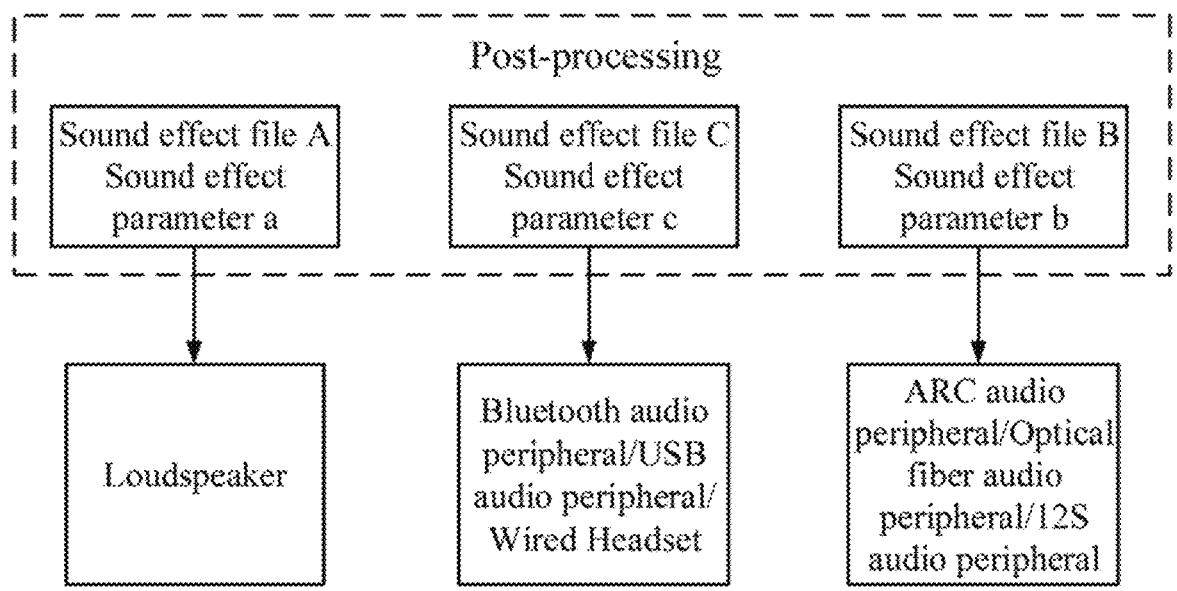
FIG. 8 is a schematic diagram of a correspondence between a sound effect file and an audio device according to some embodiments of the present application.

As shown in FIG. 8, a sound effect file can be configured for the built-in audio device (e.g., a loudspeaker), such as a sound effect file A, and the sound effect file A contains a sound effect parameter a; a sound effect file is configured for the first audio peripheral (e.g., a Bluetooth audio peripheral, a USB audio peripheral, and a wired headset), such as a sound effect file C, and the sound effect file C contains a sound effect parameter c; and a sound effect file is configured for the second audio peripheral (e.g., an ARC audio peripheral, an optical fiber audio peripheral, and a 12S audio peripheral), such as a sound effect file B, and the sound effect file B contains a sound effect parameter b. Typically, sound effect parameters matched with the built-in audio device and the audio peripheral have a large difference, e.g., the built-in audio device corresponds to a smaller number of items of the sound effect parameters, but the audio peripheral usually provides a rich items of the sound effect parameters to provide the better quality of sound effect. As a result, even though the audio streams played by the built-in audio device and the first audio peripheral belong to the same source, i.e., the sound effect parameters used in the sound effect processing are relatively similar, the similarity of the sound effect parameters mainly refers to the similarity of the values for the item of the same sound effect parameter, and it cannot make up for the difference in items of the sound effect parameters between the built-in audio device and the first audio peripheral. The difference in items of the sound effect parameters between the various audio peripherals are relatively small, and thus the built-in audio device and the first audio peripherals are further classified and configured with corresponding sound effect files respectively. Since the audio streams played by the various first audio peripherals come from the same source, the processed audio stream obtained by using the same group of sound effect parameters to perform sound effect processing of the audio streams can be adapted to the various first audio peripherals. At the same time, the group of sound effect parameters can adopt items and values that are more closely related to the audio peripherals, so as to improve the matching degree between the audio stream after sound effect processing and the various first audio peripherals, thereby improving the playback quality of the audio stream.

Herein, the sound effect parameter a and the sound effect parameter b may be set with reference to the configuration mode of the sound effect file in embodiment 1 above, which is not described herein.

In some embodiments, the sound effect parameter c may be set with reference to the setting of the sound effect parameter b in the configuration mode of the sound effect file in embodiment 1 above. For example, the sound effect parameter c may adopt a sound effect parameter that matches any of the first audio peripherals, such as adopting a sound effect parameter that matches a Bluetooth audio peripheral. For example, the sound effect parameter c may also adopt a specified sound effect parameter, which is calculated based on the corresponding sound effect parameters of the various first audio peripherals. Therefore, the specified sound effect parameter does not accurately match a certain first audio peripheral, but can better match the various first audio peripherals, so that the playback quality of the audio stream processed by using the specified sound effect parameter does not have a large gap in the various first audio peripherals, and the playback quality among the various first audio peripherals can be balanced, which will not be discussed herein.

In some embodiments, the first audio peripherals may be combined and classified according to the device types, the second audio peripherals may be combined and classified according to the device types, and each type of audio devices after division corresponds to one sound effect file. That is, the built-in audio device can correspond to one type, each combination of device types of the first audio peripherals can correspond to one type, and each combination of device types of the second audio peripherals can correspond to one type. As a result, the number of pre-stored sound effect files can be reduced through a plurality of audio peripherals of the device types correspond to the same sound effect file, thereby reducing the memory space occupied in the memory.

Figure 9:
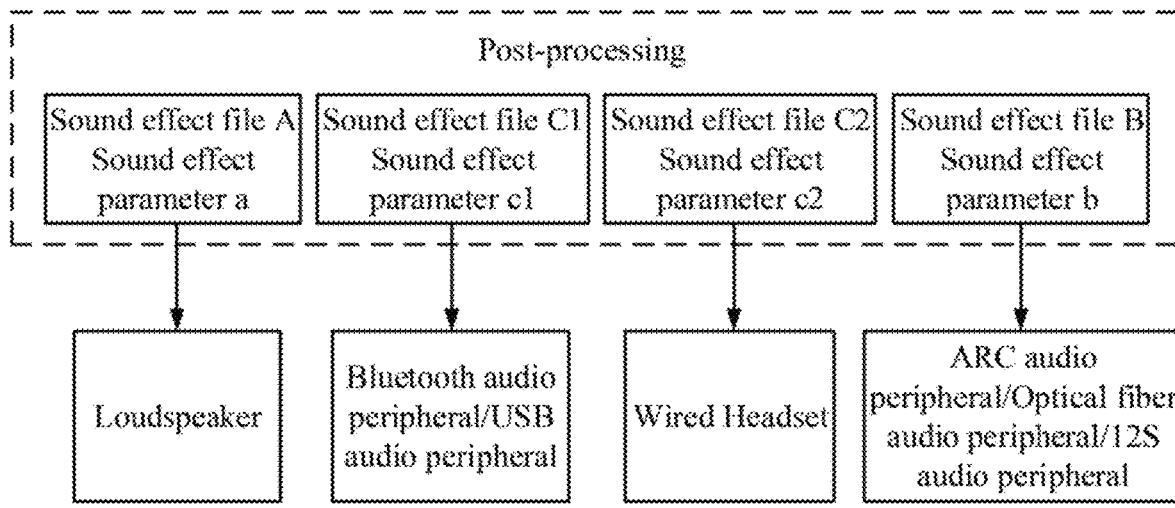
FIG. 9 is a schematic diagram of a correspondence between a sound effect file and an audio device according to some embodiments of the present application.

For example, the Bluetooth audio peripheral and the USB audio peripheral in the first audio peripherals can be combined to correspond to one type, and the wired headset in the first audio peripherals can correspond to one type. The second audio peripherals are not combined and classified, i.e., the second audio peripherals correspond to one type. As shown in FIG. 9, a sound effect file is configured for a built-in audio device (e.g., a loudspeaker), such as a sound effect file A, and the sound effect file A includes a sound effect parameter a; a sound effect file is configured for the Bluetooth audio peripheral and the USB audio peripheral, such as a sound effect file C1, and the sound effect file C1 includes a sound effect parameter c1; a sound effect file is configured for the wired headset, such as a sound effect file C2, and the sound effect file C2 includes a sound effect parameter c2; and a sound effect file is configured for the second audio peripherals (such as an ARC audio peripheral, an optical fiber audio peripheral, and a 12S audio peripheral), such as a sound effect file B, and the sound effect file B includes a sound effect parameter b. Herein, the setting of the sound effect parameter a and the sound effect parameter b can refer to the mode of configuring the sound effect file in embodiment 1 above, and the setting of the sound effect parameter c1 can refer to the mode of setting the sound effect parameter b in embodiment 1, which will not be repeated here. The sound effect parameter c2 is a sound effect parameter that precisely matches the wired headset.

Figure 10:
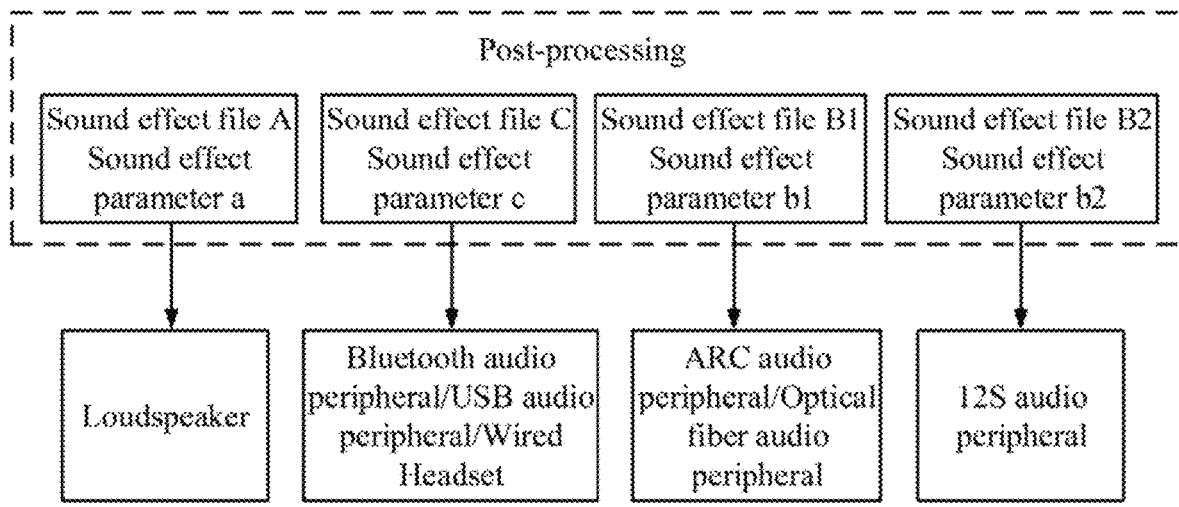
FIG. 10 is a schematic diagram of a correspondence between a sound effect file and an audio device according to some embodiments of the present application.

For example, the first audio peripherals are not combined and classified, i.e., the first audio peripherals correspond to one type. The ARC audio peripheral and the optical fiber audio peripheral in the second audio peripherals can be combined to correspond to one type, and the I2S audio peripheral in the second audio peripherals can correspond to one type. As shown in FIG. 10, a sound effect file is configured for the built-in audio device (e.g., a loudspeaker), such as a sound effect file A, and the sound effect file A includes a sound effect parameter a; a sound effect file is configured for the first audio peripherals (e.g., a Bluetooth audio peripheral, a USB audio peripheral, and a wired headset), such as a sound effect file C, and the sound effect file C includes a sound effect parameter c; a sound effect file is configured for the ARC audio peripheral and the optical fiber audio peripheral, such as a sound effect file B1, and the sound effect file B1 includes a sound effect parameter b1; and a sound effect file is configured for the I2S audio peripheral, such as a sound effect file B2, and the sound effect file B2 includes a sound effect parameter b2. Herein, a sound effect parameter a and a sound effect parameter c can be set with reference to the part corresponding to the configuration mode of the sound effect file shown in FIG. 8 above, and a sound effect parameter b1 can be set with reference to the sound effect parameter b1 in embodiment 1, which not be repeated herein. The sound effect parameter b2 is a sound effect parameter that precisely matches the I2S audio peripheral.

Figure 11:
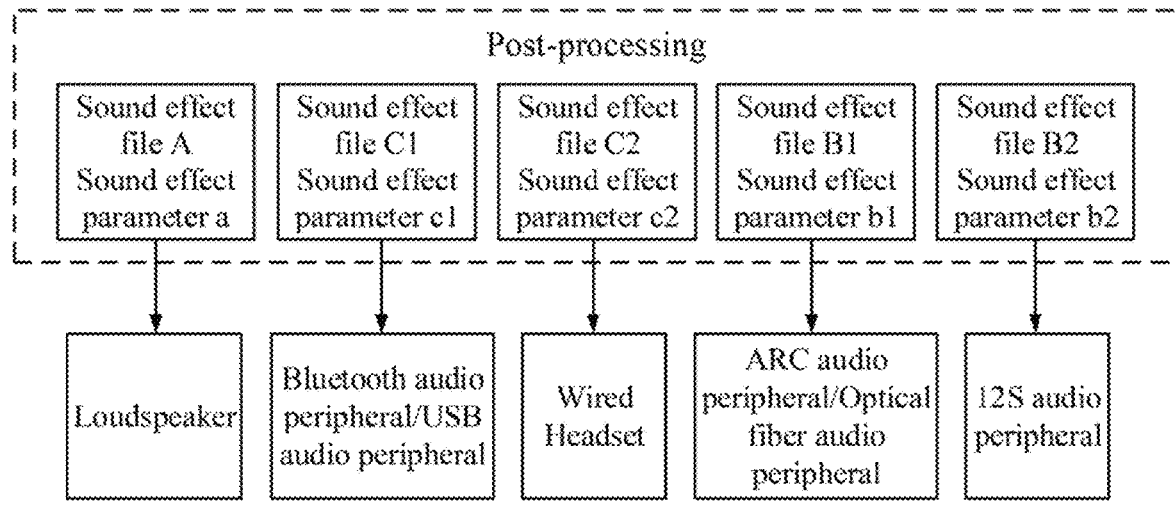
FIG. 11 is a schematic diagram of a correspondence between a sound effect file and an audio device according to some embodiments of the present application.

For example, the Bluetooth audio peripheral and the USB audio peripheral in the first audio peripherals can be combined to correspond to one type, and the wired headset in the first audio peripherals can correspond to one type. The ARC audio peripheral and the optical fiber audio peripheral in the second audio peripherals are combined to correspond to one type, and the I2S audio peripheral in the second audio peripheral corresponds to one type. As shown in FIG. 11, a sound effect file is configured for a built-in audio device (e.g., a loudspeaker), such as a sound effect file A, and the sound effect file A includes a sound effect parameter a; a sound effect file is configured for the Bluetooth audio peripheral and the USB audio peripheral, such as a sound effect file C1, and the sound effect file C1 includes a sound effect parameter c1; a sound effect file is configured for the wired headset, such as a sound effect file C2, and the sound effect file C2 includes a sound effect parameter c2; a sound effect file is configured for the ARC audio peripheral and the optical fiber audio peripheral, such as the sound effect file B1, and the sound effect file B1 contains the sound effect parameter b1; and a sound effect file is configured for the I2S audio peripheral, such as a sound effect file B2, and the sound effect file B2 contains the sound effect parameter b2. Herein, the setting of the sound effect parameter a can refer to the setting of the sound effect parameter a in embodiment 1 above, the sound effect parameter c1 and the sound effect parameter c2 can be set with reference to the part corresponding to the configuration mode of the sound effect file shown in FIG. 9 above, and the sound effect parameter b1 and the sound effect parameter b2 can be set with reference to the part corresponding to the configuration mode of the sound effect file shown in FIG. 10 above, which will be repeated herein.

Figure 12:
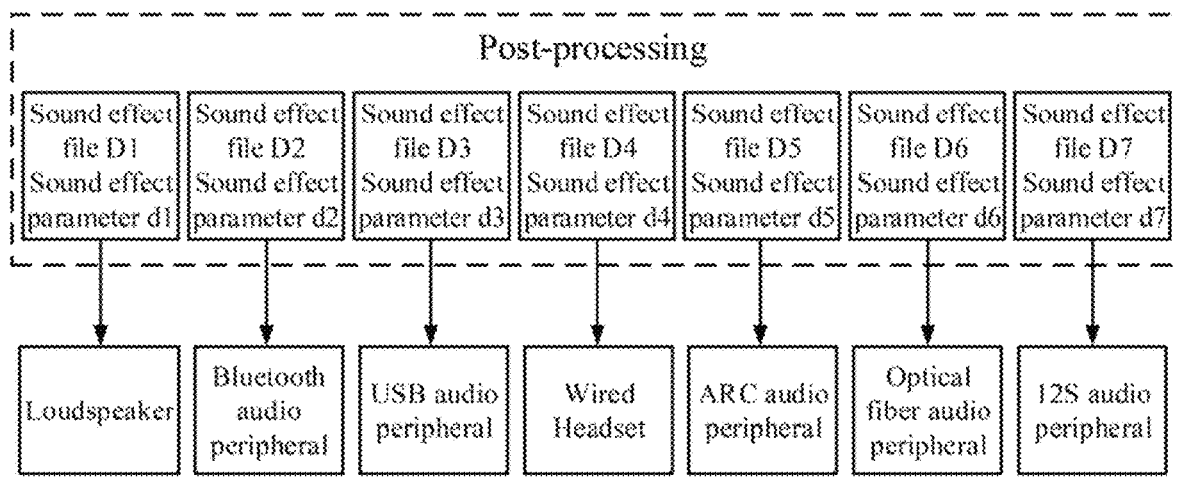
FIG. 12 is a schematic diagram of a correspondence between a sound effect file and an audio device according to some embodiments of the present application.

In embodiment 3, the audio devices can be classified according to the device types of the audio devices, and each type of audio devices can correspond to one sound effect file. In the embodiment, audio devices can be accurately classified according to the device types, i.e., the built-in audio device, the Bluetooth audio peripheral, the USB audio peripheral, the wired headset, the ARC audio peripheral, the optical fiber audio peripheral, and the I2S audio peripheral correspond to one type respectively. Therefore, a sound effect parameter in each sound effect file can accurately match the corresponding audio device. Thus, before the audio stream is transmitted to the currently used audio device, the sound effect parameter in the corresponding sound effect file is used for sound effect processing, so that the processed audio stream can accurately match the currently used audio device, to effectively improve the playback quality of the audio stream. As shown in FIG. 12, a sound effect file is configured for the built-in audio device (e.g., a loudspeaker), such as a sound effect file D1, which includes a sound effect parameter d1; a sound effect file is configured for the Bluetooth audio peripheral, such as a sound effect file D2, which includes a sound effect parameter d2; a sound effect file is configured for the USB audio peripheral, such as a sound effect file D3, which includes a sound effect parameter d3; a sound effect file is configured for the wired headset, such as a sound effect file D4, which includes a sound effect parameter d4; a sound effect file is configured for the ARC audio peripheral, such as a sound effect file D5, which includes a sound effect parameter d5; a sound effect file is configured for the optical fiber audio peripheral, such as a sound effect file D6, which includes a sound effect parameter d6; and a sound effect file is configured for the I2S audio peripheral, such as a sound effect file D7, which includes a sound effect parameter d7. Herein, the setting of the sound effect parameter d1 can be referred to the setting of the sound effect parameter a in the above embodiment 1, and will not be repeated herein; and the rest of the sound effect parameters are accurately matched with the corresponding audio peripherals.

The sound effect files in each of the above embodiments can be pre-stored in the memory of the display apparatus 200, so that when the audio stream is played using the audio device, the pre-stored sound effect files can be used directly to improve the efficiency of the sound effect processing, to avoid the playback delay of the audio stream, and ensure the playback quality of the audio stream. Herein, when the display apparatus 200 is set before leaving the factory, the sound effect parameter in each sound effect file can correspond to an initial value, which may be set based on the sound effect parameter matched with pre-registered various types of audio devices.

S502, A currently used target audio device is identified.

Figures 13, 14:
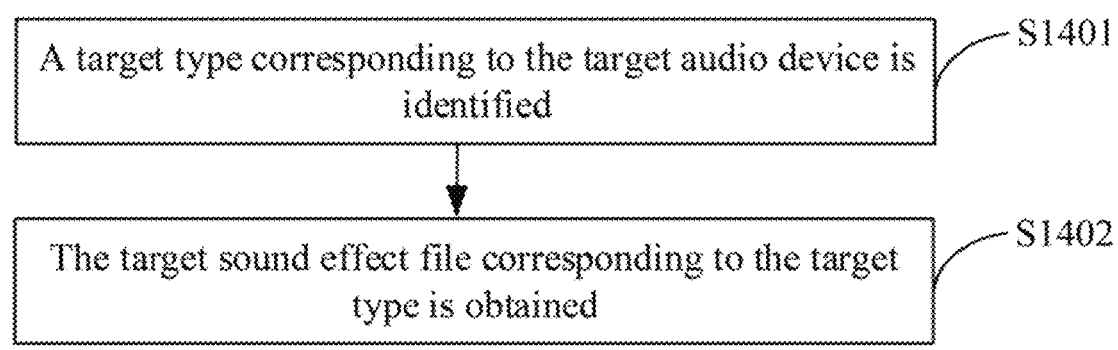
FIG. 13 is a schematic diagram of an audio device list according to some embodiments of the present application.
FIG. 14 is a schematic diagram of a flow of obtaining a target sound effect file according to some embodiments of the present application.

In the embodiment, the currently used audio device is referred to as the target audio device, such as a built-in audio device used by the display apparatus 200 by default, or an audio peripheral indicated by the user. By identifying the user command, the target audio device can be determined. As shown in FIG. 13, an audio device list can include options for audio devices, such as a loudspeaker (built-in audio device), a Bluetooth headset (Bluetooth audio peripheral), a wired headset (wired headphone), a USB stereo (USB audio peripheral), an ARC audio peripheral, an optical fiber audio peripheral, and a I2S audio peripheral. Herein, options of audio devices currently connected to the display apparatus 200 are in an active state, i.e., they can be selected; and an option of the audio device not currently connected to the display apparatus 200 is in a grayed-out state, such as the Bluetooth headset, i.e., it cannot be selected. The user can select the target audio device to be used based on the audio device list, e.g., the user can move a focus to an option of the target audio device by manipulating the control device 100, such as a remote control, and send a selection command to the display apparatus 200 by pressing a "confirm" key, to indicate the display apparatus 200 to play the audio stream by using the target audio device. In response to the selection command, the display apparatus 200 can identify a current location of the focus, i.e., the option of the target audio device, to identify the target audio device currently in use.

S503, A target sound effect file corresponding to the target audio device is obtained.

Based on a correspondence between the audio devices and the sound effect files in the above embodiments, a sound effect file corresponding to the target audio device, i.e., the target sound effect file, can be accurately determined.

The target sound effect file can be obtained with reference to a flow shown in FIG. 14, with the following specific steps.

S1401. A target type corresponding to the target audio device is identified.

According to the classification mode of the audio devices in the above embodiments, a type corresponding to the target audio device, i.e., the target type, may be identified.

S1402. The target sound effect file corresponding to the target type is obtained.

The following are examples 1 to 6 for illustrating how to determine the target sound effect file based on the correspondence between the audio devices and the sound effect files in the present application. In example 1, the target sound effect file can be determined according to the correspondence between the audio devices and the sound effect files in embodiment 1. Referring to FIG. 7, based on that the target audio device is a loudspeaker, the target type is a type corresponding to the built-in audio device and the first audio peripheral, and the target sound effect file is the sound effect file A; based on that the target audio device is a Bluetooth audio peripheral, the target type is a type corresponding to the built-in audio device and the first audio peripheral, and the target sound effect file is the sound effect file A; and based on that the target audio device is an ARC audio peripheral, the target type is a type corresponding to the second audio peripheral, and the target sound effect file is the sound effect file B.

In example 2, the target sound effect file can be determined according to the correspondence between the audio devices and the sound effect files in embodiment 2. Referring to FIG. 8, based on that the target audio device is a loudspeaker, the target type is a type corresponding to the built-in audio device, and the target sound effect file is the sound effect file A; based on that the target audio device is a Bluetooth audio peripheral, the target type is a type corresponding to the first audio peripheral, and the target sound effect file is the sound effect file C; and based on that the target audio device is an ARC audio peripheral, the target type is a type corresponding to the second audio peripheral, and the target sound effect file is the sound effect file B.

In example 3, the target sound effect file can be determined according to the correspondence between the audio devices and the sound effect files in embodiment 2. Referring to FIG. 9, based on that the target audio device is a loudspeaker, the target type is a type corresponding to the built-in audio device, and the target sound effect file is the sound effect file A; based on that the target audio device is a Bluetooth audio peripheral, the target type is a type corresponding to the Bluetooth audio peripheral and the USB audio peripheral, and the target sound effect file is the sound effect file C1; based on that the target audio device is a wired headset, the target type is a type corresponding to the wired headset, and the target sound effect file is the sound effect file C2; and based on that the target audio device is an ARC audio peripheral, the target type is a type corresponding to the second audio peripheral, and the target sound effect file is the sound effect file B.

In example 4, the target sound effect file can be determined according to the correspondence between the audio devices and the sound effect files in embodiment 2. Referring to FIG. 10, based on that the target audio device is a loudspeaker, the target type is a type corresponding to the built-in audio device, and the target sound effect file is the sound effect file A; based on that the target audio device is a Bluetooth audio peripheral, the target type is a type corresponding to the first audio peripheral, and the target sound effect file is the sound effect file C; based on that the target audio device is an ARC audio peripheral, the target type is a type corresponding to the ARC audio peripheral and the optical fiber audio peripheral, and the target sound effect file is the sound effect file B1; and based on that the target audio device is a 12S audio peripheral, the target type is a type corresponding to the 12S audio peripheral, and the target sound effect file is the sound effect file B2.

In example 5, the target sound effect file can be determined according to the correspondence between the audio devices and the sound effect files in embodiment 2. Referring to FIG. 11, in this example, the corresponding target sound files when using different audio devices as the target audio device may be referred to as example 3 and example 4. Herein, reference can be made to example 3 when the target audio device is a built-in audio device, a Bluetooth audio peripheral, a USB audio peripheral, or a wired headset; and reference can be made to example 4 when the target audio device is an ARC audio peripheral, an optical fiber audio peripheral, or a 12S audio peripheral.

In example 6, the target audio file can be determined according to the correspondence between the audio devices and the sound effect files in embodiment 3. Referring to FIG. 12, different target audio devices correspond to different types and correspond to different sound effect files, which are not described herein.

In some embodiments, each type of audio devices can correspond to a plurality of sound effect files, and each of the plurality of sound effect files can correspond to a type of scenarios. In this embodiment, information of the scenarios corresponding to the sound effect files refers to audio content of the audio stream and/or an environment in which the audio device is used. For example, the audio content is music, corresponding to one sound effect file; and the audio content is a language, corresponding to one sound effect file, and so on. A noisy environment corresponds to one sound effect file, and a quiet environment corresponds to one sound effect file. It is also possible that a combination of the audio content and the use environment corresponds to one sound effect file, for example, a combination of the audio content as music and the use environment as a noisy environment corresponds to one sound effect file, a combination of the audio content as a language and the use environment as a quiet environment corresponds to one sound effect file, a combination of the audio content as music and the use environment as a quiet environment corresponds to one sound effect file, and a combination of the audio content as a language and the use environment as a noisy environment corresponds to one sound effect file.

In other words, the sound effect parameter in the sound effect file not only match the playing configuration of the audio device itself, but also match the specific audio content played and the specific use scenario. As a result, the audio stream processed using the sound effect file can not only match the audio device, but also match the audio content played and the use environment, to effectively improve the playback quality of the audio stream.

In this embodiment, the correspondence between each type of audio devices and the plurality of sound effect files can be referred to the correspondence between each type of audio devices and the sound effect file as described in embodiment 1 to embodiment 3, and only one sound effect file originally corresponding is replaced by a plurality of sound effect files that contain the sound effect parameter matching the audio device of the type and have different audio contents and use scenarios, which will not be further discussed herein.

Figure 15:
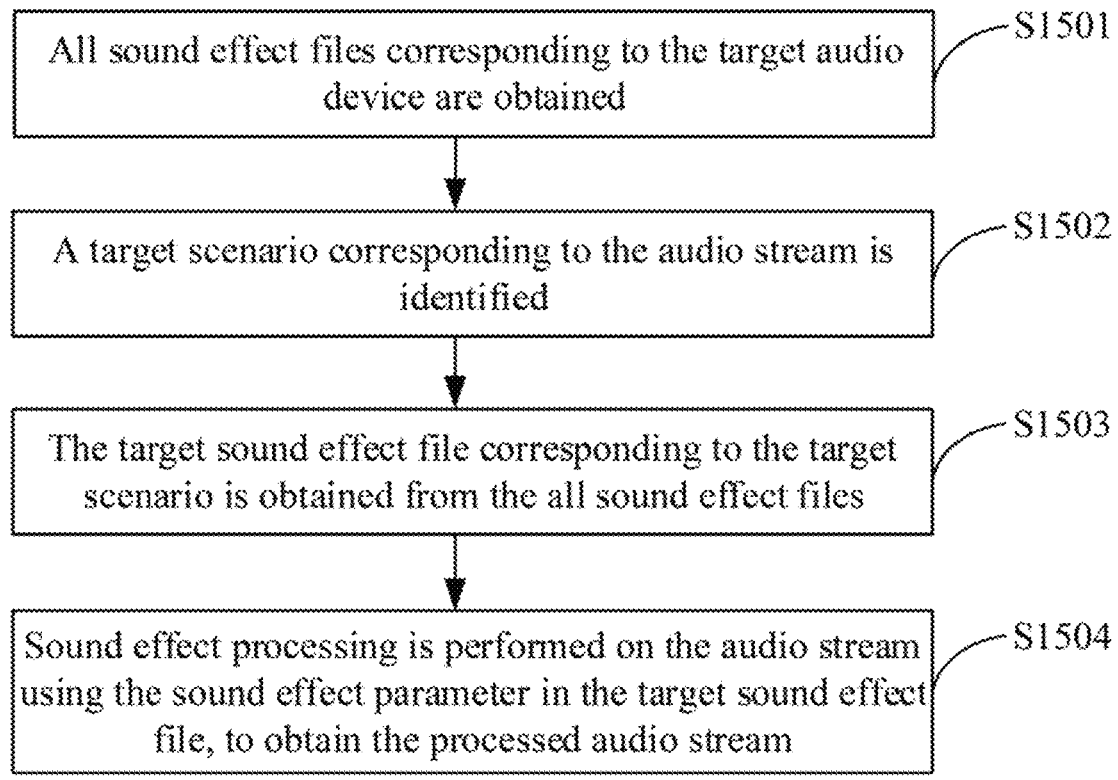
FIG. 15 is a schematic diagram of a flow of obtaining a target sound effect file according to some embodiments of the present application.

Based on the above correspondence between the sound effect files and the scenarios, the target sound effect file can be determined with reference to the flow shown in FIG. 15, with the following specific steps.

S1501. All sound effect files corresponding to the target audio device are obtained.

The target audio device can be determined according to the process of determining the target audio device as described above, which is not repeated herein. The target type corresponding to the target audio device can be determined based on the correspondence between the audio devices and the types, and this determination process can refer to the process of determining the target type above, which will not be repeated here. Based on the correspondence between each type of audio devices and the sound effect files, all sound effect files corresponding to the target type to which the target audio device belongs are obtained. Each of the all sound effect files can contain the sound effect parameter matching the target audio device, and the sound effect parameters in the sound effect files can correspond to different audio contents and/or use scenarios.

For example, the target audio device is a wired headset, its corresponding target type is a wired headset, and its corresponding all sound effect files include: a sound effect file E1, which corresponds to the audio content as music, corresponds to the use scenario with a quiet environment, and contains a sound effect parameter e1; a sound effect file E2, which corresponds to the audio content as a language, corresponds to the use environment as a quiet environment, and contains a sound effect parameter e2; a sound effect file E3, which corresponds to the audio content as music, corresponds to the use environment as a noisy environment, and contains a sound effect parameter e3; and a sound effect file E4, which corresponds to the audio content as a language, corresponds to the use environment as a noisy environment, and contains a sound effect parameter e4.

S1502. A target scenario corresponding to the audio stream is identified.

Figure 16:
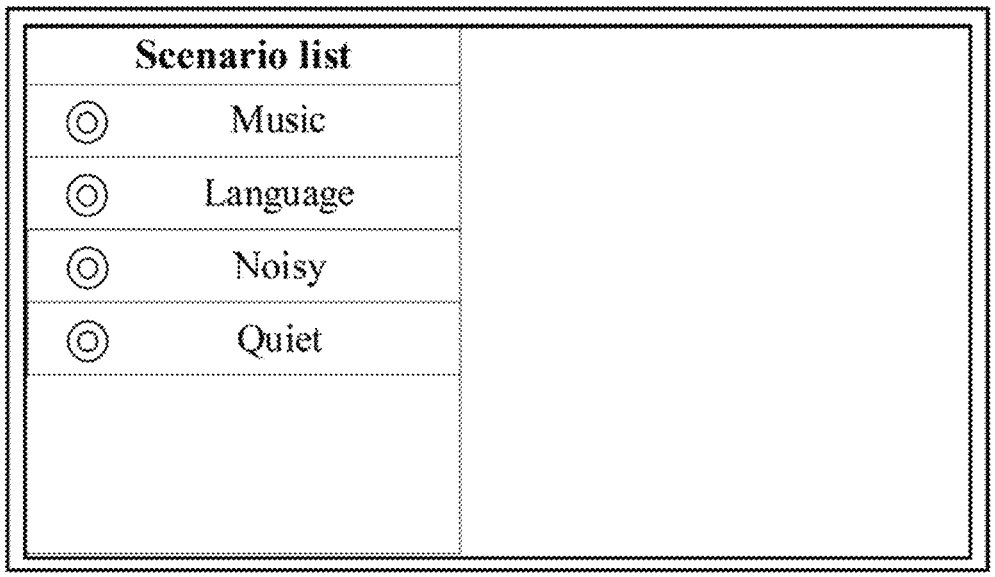
FIG. 16 is a schematic diagram of a scenario list according to some embodiments of the present application.

The display apparatus 200 can determine the target scenario corresponding to the audio stream based on a command from the user. After the user selects the target audio device based on the audio device list as shown in FIG. 13, such as selecting a Bluetooth headset, a scenario list as shown in FIG. 16 is displayed. The scenario list can include options of the audio content and the use scenario. The user can select one or more options, i.e., selecting the target scenario, based on the scenario list. For example, the user sends a selection command to the display apparatus 200 by manipulating the remote control to indicate that the selected target scenario is a scenario with music and a quiet environment, and the display apparatus 200 can determine the corresponding target scenario based on the selection command.

S1503. The target sound effect file corresponding to the target scenario is obtained from the all sound effect files.

Based on the example given in S1502, the target sound effect file corresponding to the target scenario with music and a quiet environment is E1. Therefore, the sound effect parameter in the target sound effect file currently in use can match not only the target audio device, but also the audio content of the audio stream currently being played and the environment in which the target audio device is currently being used, to further improve the playback quality.

S504/S1504. Sound effect processing is performed on the audio stream using the sound effect parameter in the target sound effect file, to obtain the processed audio stream.

After determining a target sound effect file based on the above steps, the audio stream can be subjected to sound effect processing by using the sound effect parameter in the target sound effect file. The processed audio stream can be matched with the target audio device, which can effectively ensure the playback quality of the audio stream.

The display apparatus can pre-store the sound effect file corresponding to each audio device, so that when performing sound effect processing on the audio stream output to the built-in audio device of the display apparatus and the external audio device, the corresponding sound effect parameters can be used respectively, and thus the processed audio stream can be matched with the corresponding audio device, thereby ensuring the playback quality of the audio stream.

Figure 17:
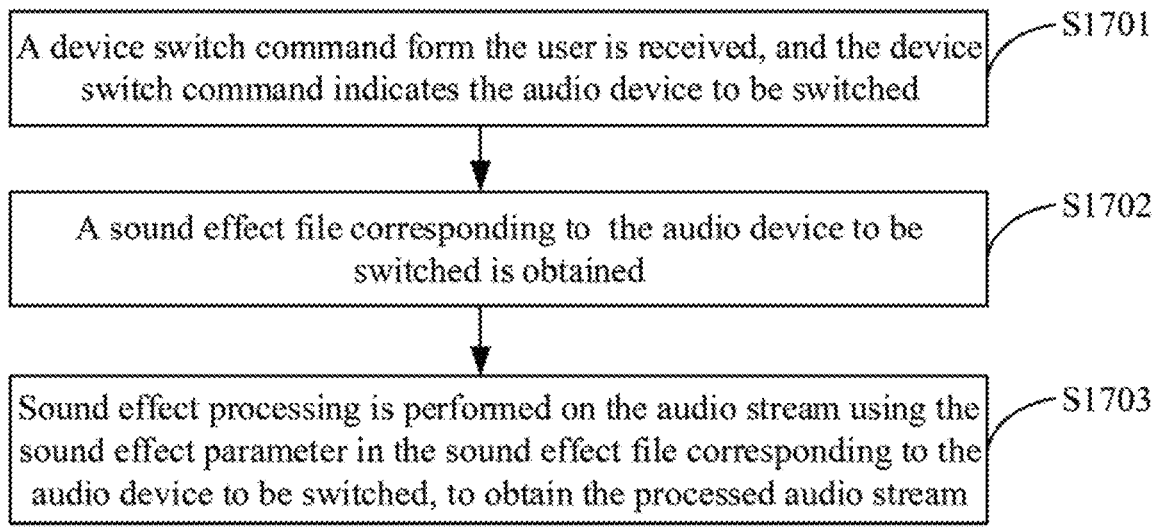
FIG. 17 is a schematic diagram of a flow of switching an audio device according to some embodiments of the present application.

In some embodiments, when using the target audio device, the user may need to switch the audio device, i.e., there is a need to switch the target audio device to another audio device to continue to play the audio stream using another audio device. The audio device can be switched with reference to the flow shown in FIG. 17, with the following specific steps.

S1701. A device switch command form the user is received, and the device switch command indicates the audio device to be switched.

The user can select the audio device to be switched based on an audio device list as shown in FIG. 13. For example, the target audio device currently in use is a wired headset, and the audio device to be switched is a USB stereo.

S1702. A sound effect file corresponding to the audio device to be switched is obtained.

The process of the display apparatus 200 obtaining the sound effect file corresponding to the audio device to be switched can be referred to the process of obtaining the target sound effect file as described above, and will not be repeated herein.

S1703. Sound effect processing is performed on the audio stream using the sound effect parameter in the sound effect file corresponding to the audio device to be switched, to obtain the processed audio stream.

The process of performing sound effect processing on the audio stream using the sound effect parameter in the target sound effect file can be described with reference to the above implementation. As a result, after switching the audio device, the audio stream can also be accurately processed using the sound effect file corresponding to the audio device after being switched, to ensure the playback quality of the audio stream played by the audio device after being switched.

Based on the pre-configured mode of the sound effect file disclosed above, the initial value of the sound effect parameter in the sound effect file is based on the sound effect parameter corresponding to each type of audio devices on the market, that is, the generalized sound effect parameter corresponding to each type of audio devices. In the way in which the values of the sound effect parameters are directly adjusted by the display apparatus 200, the sound effect parameters of various types of audio devices will be adjusted accordingly, i.e., it is not possible to individually adjust the sound effect parameter of the audio device currently in use. Therefore, based on that the user needs to individually set the sound effect parameters currently in use based on personal preference, the settings may be individually updated via the cloud server. As shown in the schematic diagram of a scenario shown in FIG. 1, the server 400 may be a cloud server for configuring and updating the sound effect parameters.

In embodiment 4, the sound effect parameters of various types of audio devices can be configured at the cloud server according to a type of the display apparatus 200.

The display apparatuses 200 can be classified according to device parameters, such as a brand, country, language, model, and device ID, etc., and different types of display apparatuses 200 can have corresponding classification modes of audio devices (refer to the classification mode of audio devices above). A sound effect engineer may configure sound effect parameters for each type of audio devices on each type of display apparatuses 200 according to types of the display apparatuses 200, and store the sound effect parameters corresponding to various types of audio devices and the display apparatus 200 of the corresponding type. For example, a type corresponding to the display apparatus 200 is "Brand: xx; Country: China; Language: Chinese; Model: ****; Device ID: ", and the classification mode of the audio devices corresponding to the display apparatus 200 of this type can be referred to embodiment 3. The sound effect parameters configured by the sound effect engineer for various types of audio devices are respectively "a sound effect parameter d1 of the built-in audio device (e.g., a loudspeaker), a sound effect parameter d2 of the Bluetooth audio peripheral, a sound effect parameter d3 of the USB audio peripheral, a sound effect parameter d4 of the wired headset, a sound effect parameter d5 of the ARC audio peripheral, a sound effect parameter d6 of the optical fiber audio peripheral, and a sound effect parameter d7 of the I2S audio peripheral". Then the type corresponding to the above display apparatus 200 and the sound effect parameters corresponding to various types of audio devices are stored correspondingly. As a result, based on the type of the display apparatus 200, i.e., the device parameters, the sound effect parameters of various types of audio devices corresponding to the display apparatus 200** can be accurately determined.

In embodiment 5, based on embodiment 4, according to a user account, in a cloud server, the sound effect parameters of various types of audio devices on each type of display apparatus 200 bound by the user account can be stored.

After the user logs into the user account on the currently used display apparatus 200, the display apparatus 200 may use stored data corresponding to the user account, for example, using the sound effect parameters of various types of audio devices corresponding to the bound display apparatus 200 with the same type as the current display apparatus 200. For example, based on that the user account A binds the display apparatus 200 of a type a and the display apparatus 200 of a type b, the user account A, and sound effect parameters of audio devices on the display apparatus 200 of the type a and the display apparatus 200 of the type b, such as sound effect data m1 of audio devices corresponding to the display apparatus 200 of the type a and sound effect data m2 of audio devices corresponding to the display apparatus 200 of the type b, are stored at the cloud server. Based on that the display apparatus 200 currently used by the user corresponds to the type a, the sound effect data m1 can be used directly to perform sound effect processing on the audio stream after logging into the user account A on the current display apparatus 200.

Figure 18:
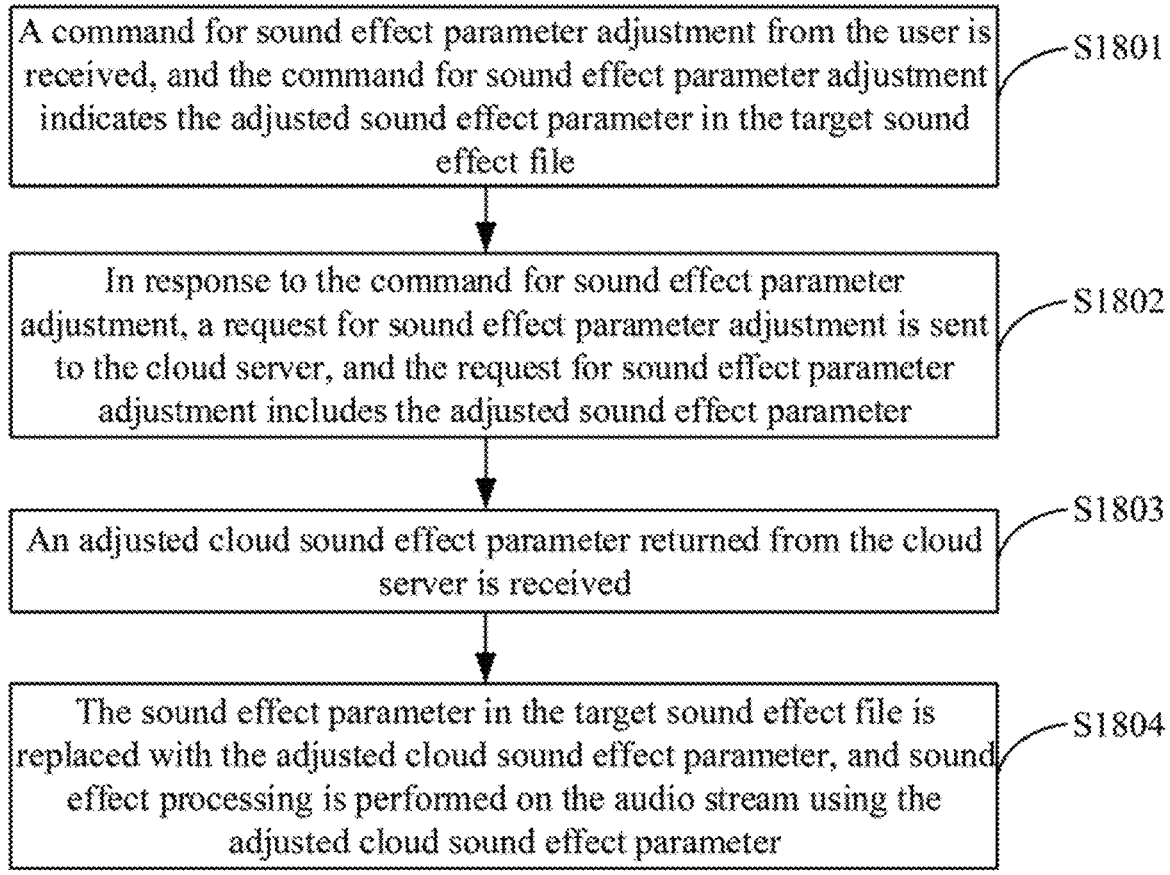
FIG. 18 is a schematic diagram of a flow of adjusting a sound effect parameter according to some embodiments of the present application.

A sound effect parameter can be adjusted with reference to the flowchart shown in FIG. 18, with the following specific steps.

S1801. A command for sound effect parameter adjustment from the user is received, and the command for sound effect parameter adjustment indicates the adjusted sound effect parameter in the target sound effect file.

The user can send the command for sound effect parameter adjustment to the display apparatus 200 by manipulating the control device 100, indicating the target sound effect file to be adjusted and the adjusted sound effect parameter.

For example, based on a storage method at the cloud server in embodiment 4, the adjusted sound effect parameter can be a user-defined sound effect parameter.

For example, based on a storage method at the cloud server in embodiment 5, the adjusted sound effect parameter may be a user-defined sound effect parameter, and may also be the sound effect parameter corresponding to the user account indicated by the user.

S1802. In response to the command for sound effect parameter adjustment, a request for sound effect parameter adjustment is sent to the cloud server, and the request for sound effect parameter adjustment includes the adjusted sound effect parameter.

The display apparatus 200, in response to the command for sound effect parameter adjustment, can detect a current network connection state, and send a request for sound effect parameter adjustment to the cloud server when the network is in a connection state. The request for sound effect parameter adjustment can carry the adjusted sound effect parameter.

S1803. An adjusted cloud sound effect parameter returned from the cloud server is received, and the adjusted cloud sound effect parameter is based on the adjusted sound effect parameter.

After receiving the request for sound effect parameter adjustment, the cloud server can identify the type of the display apparatus 200 sending the request. When the adjusted sound effect parameter is a user-defined parameter, the cloud sound effect parameter stored within the cloud server can be found according to the type of the display apparatus 200, and the cloud sound effect parameter can be adjusted according to the user-defined parameter to obtain the adjusted cloud sound effect parameter. When the adjusted sound effect parameter is a sound effect parameter for a user account indicated by the user, a cloud sound effect parameter for the user account stored within the cloud server can be found according to the user account, and the cloud sound effect parameter can be the adjusted cloud sound effect parameter. The cloud server can return the adjusted cloud sound effect parameter to the display apparatus 200 for configuration and update by the display apparatus 200.

S1804. The sound effect parameter in the target sound effect file is replaced with the adjusted cloud sound effect parameter, and sound effect processing is performed on the audio stream using the adjusted cloud sound effect parameter.

The display apparatus 200 can receive the adjusted cloud sound effect parameter returned from the cloud server, and replace the sound effect parameter in the target sound effect file with the adjusted cloud sound effect parameter to complete the personalized configuration of the target sound effect file. For example, based on that the adjusted cloud sound effect parameter is the sound effect parameter adjusted based on the user-defined parameter, the user-defined parameter can be used after the personalized configuration of the target sound effect file; and based on that the adjusted cloud sound effect parameter is the sound effect parameter for the user account indicated by the user, data sharing with the user account will be realized after the personalized configuration of the target sound effect file.

Thus, based on the adjustment of the sound effect parameter in the target sound effect file by the cloud server, individual adjustment of the sound effect parameter in the target sound effect file can be realized. The user can adjust sound effect parameters corresponding to other audio devices in the same manner as the adjustment of the sound effect parameters in the target sound effect file, to realize the independent adjustment of the sound effect parameter in each sound effect file.

Figure 19:
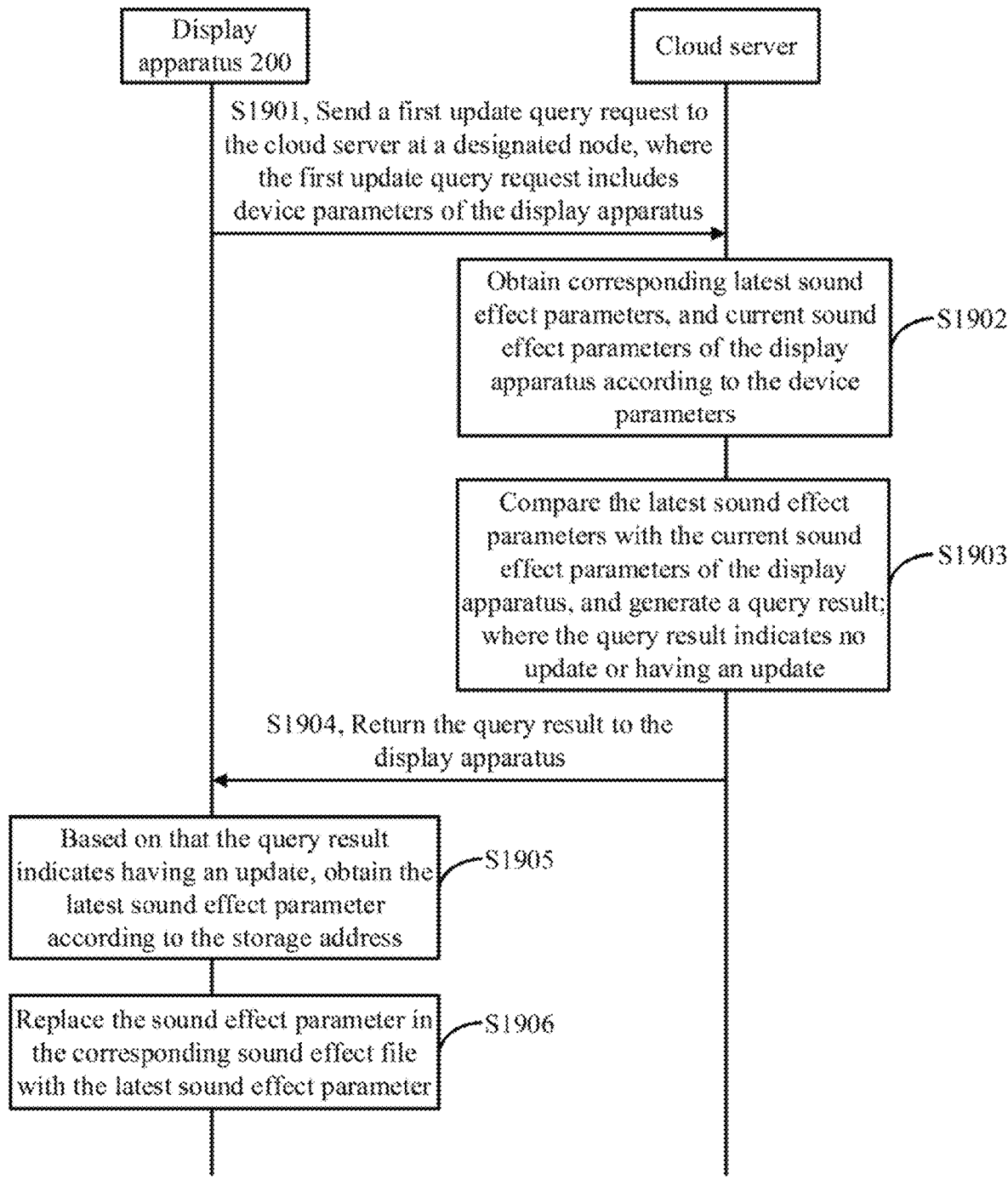
FIG. 19 is a schematic diagram of a flow of synchronizing a cloud server and updating a configuration of a sound effect file according to some embodiments of the present application.

In some embodiments, various types of audio devices are constantly updated with corresponding sound effect parameters based on the developer's research and development to improve the playback quality. Referring to the flowchart shown in FIG. 19, the sound effect files on the display apparatus 200 can be synchronously updated, with the following specific steps.

S1901. The display apparatus sends a first update query request to the cloud server at a designated node, and the first update query request includes device parameters of the display apparatus.

In the embodiment, the specified node may be after the display apparatus 200 is powered on, or may be a set specified period, specified date, specified time, etc. The display apparatus 200 can detect a current network connection state at the designated node, and send a first update query request to the cloud server based on that the network is in a connection state, to request to query whether the sound effect parameters of various types of audio devices on the current display apparatus have been updated. Based on the storage method at the cloud server in embodiment 4, i.e., the corresponding storage method according to the type of the display apparatus and the sound effect parameters of various types of audio devices, the first update query request sent by the display apparatus 200 to the cloud server can carry the device parameters of the display apparatus 200 for querying the relevant sound effect parameters by the cloud server.

S1902. The cloud server obtains corresponding latest sound effect parameters, and current sound effect parameters of the display apparatus according to the device parameters.

The cloud server can obtain the latest sound effect parameters corresponding to the current display apparatus 200 and the current sound effect parameters of the display apparatus 200, based on the correspondence between the type (device parameters) of the display apparatus and sound effect parameters of various types of audio devices. Herein, the latest sound effect parameters can be provided by the developer; and the current sound effect parameter of the display apparatus 200 may be saved by actively uploading the sound effect parameter in the configured sound effect file to the cloud server after each configuration of the sound effect file by the display apparatus 200, so that the cloud server may directly obtain the sound effect parameter from the currently stored sound effect parameters. The current sound effect parameters of the display apparatus 200 may also be uploaded by the display apparatus 200 to the cloud server in real time, for example, after the cloud server receives the first update query request, the cloud server can send a request for obtaining the current sound effect parameters to the display apparatus 200, and based on the request for obtaining the current sound effect parameters, the display apparatus 200 can send the current sound effect parameters to the cloud server.

S1903. The cloud server compares the latest sound effect parameters with the current sound effect parameters of the display apparatus, and generates a query result; and the query result indicates no update or having an update.

The cloud server can determine whether there is an update by comparing the latest sound effect parameters with the current sound effect parameters of the display apparatus 200, and generate a query result based on the determination result. Herein, based on that the latest sound effect parameter is different from the current sound effect parameter of the display apparatus, the query result indicates that there is an update, and the query result also includes a storage address of the latest sound effect parameter. When the latest sound effect parameters are the same as the current sound effect parameters of the display apparatus, the query result indicates that there is no update.

S1904. The cloud server returns the query result to the display apparatus.

S1905. Based on that the query result indicates having an update, the display apparatus obtains the latest sound effect parameter according to the storage address.

Based on that the query result indicates no update, the display apparatus 200 does not need to update the configuration of the sound effect file. Based on that the query result indicates that there is an update, the display apparatus 200 can obtain a storage address from the query result and obtain the latest sound effect parameter according to the storage address; and the latest sound effect parameter is the updated sound effect parameter.

S1906. The display apparatus replaces the sound effect parameter in the corresponding sound effect file with the latest sound effect parameter.

The display apparatus 200 can replace the sound effect parameter in the corresponding sound effect file with the latest sound effect parameter obtained to complete the updated configuration of the sound effect file. The sound effect parameter in the configured sound effect file, i.e., the latest sound effect parameter, can be used to perform sound effect processing on the audio stream.

As a result, based on that there is an update of the sound effect parameter of the audio peripheral, the updated sound effect parameter in the cloud server can be synchronously updated to the display apparatus, ensuring timeliness of the sound effect parameters used in sound effect processing.

Figure 20:
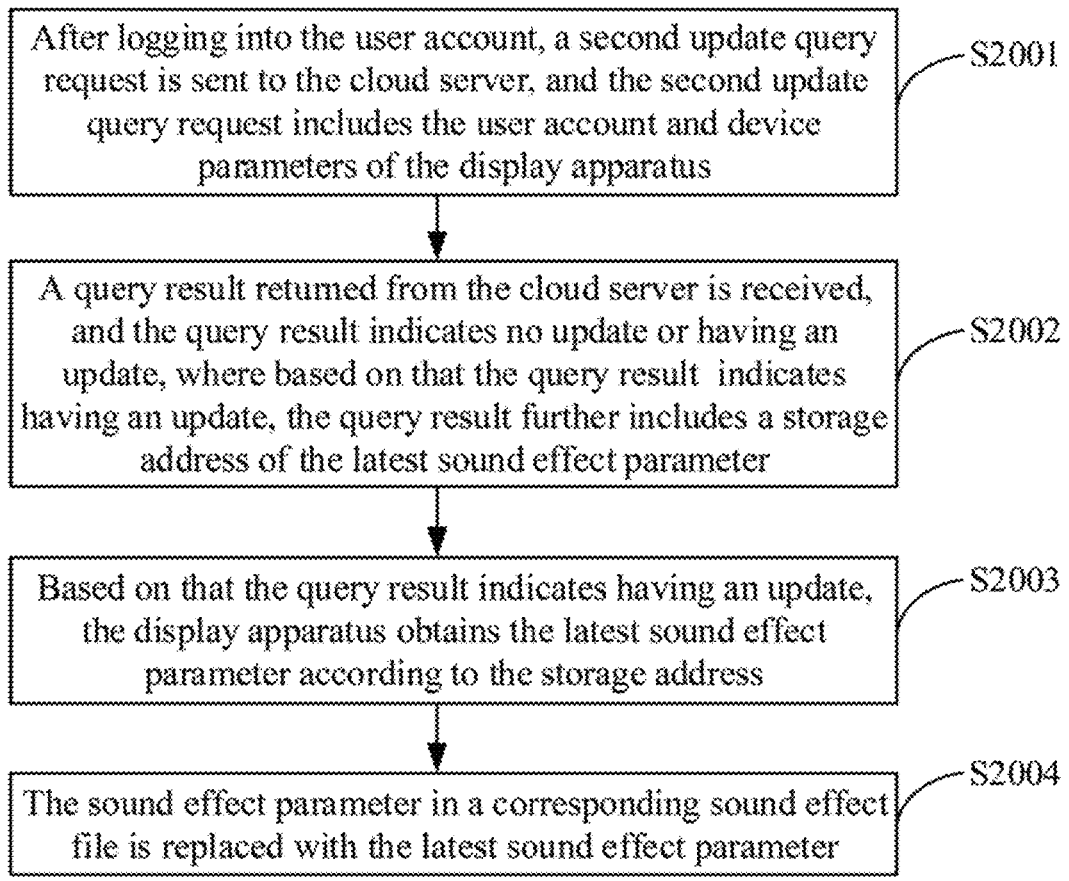
FIG. 20 is a schematic diagram of a flow of synchronizing a cloud server and updating a configuration of a sound effect file according to some embodiments of the present application.

In some embodiments, the sound effect parameters of various types of audio devices on each type of display apparatuses can be updated according to the user account, to make the processed sound effects closer to the user's needs. Referring to the flowchart shown in FIG. 20, the sound effect file on the display apparatus 200 can be synchronously updated with the following specific steps.

S2001. After logging into the user account, a second update query request is sent to the cloud server, and the second update query request includes the user account and device parameters of the display apparatus.

After the display apparatus 200 logs into the user account, the display apparatus 200 may share the sound effect parameters for the user account. The display apparatus 200 can detect a current network connection state and send a second update query request to the cloud server based on that the network is in a connected state, to request to query whether the sound effect parameters of various types of audio devices on the current display apparatus have been updated. Based on the storage method at the cloud server in embodiment 5, i.e., according to the user account, and the corresponding storage method of the type of the display apparatus and the sound effect parameters of various types of audio devices for the user account, the second update query request sent by the display apparatus 200 to the cloud server carries the currently logged-in user account, device parameters of the display apparatus 200 and relevant sound effect parameters for querying by the cloud server.

The cloud server can obtain, according to the user account and the device parameters, the latest sound effect parameters corresponding to the display apparatus 200, and the current sound effect parameters of the display apparatus. Herein, the method of obtaining the current sound effect parameters of the display apparatus 200 may refer to S1902.

The cloud server can compare the latest sound effect parameters with the current sound effect parameters of the display apparatus and generate a query result, and the query result can indicate no update or having an update. Herein, the query result indicates having an update based on that the latest sound effect parameters are different from the current sound effect parameters of the display apparatus. For example, an update field can be added to the query result and a value of the field can be set to a first numerical value (e.g., 1) to indicate that there is an update, and the query result can also include a storage address of the latest sound effect parameters for the user account. Based on that the latest sound effect parameters are the same as the current sound effect parameters of the display apparatus, the query result indicates that there is no update. For example, a value of the update field can be set to a second numerical value (e.g., 0) to indicate that there is no update.

S2002. A query result returned from the cloud server is received, and the query result indicates no update or having an update, where based on that the query result indicates having an update, the query result further includes a storage address of the latest sound effect parameter.

S2003. Based on that the query result indicates having an update, the display apparatus obtains the latest sound effect parameter according to the storage address.

Based on that the query result indicates no update, the display apparatus 200 does not need to update the configuration of the sound effect file. Based on that the query result indicates having an update, the display apparatus 200 can obtain a storage address from the query result and obtain the latest sound effect parameter according to the storage address, herein, the latest sound effect parameter is the sound effect parameter after being updated.

S2004. The sound effect parameter in a corresponding sound effect file is replaced with the latest sound effect parameter.

Based on the same user account, a plurality of display apparatuses 200 for the user account can update and configure sound effect files at the same time. Moreover, based on that the display apparatus 200 currently logged into the user account is an unfamiliar apparatus, i.e., the display apparatus 200 is not bound with the user account, for example, a display apparatus 200 newly purchased by the user, sound effect files can also be quickly updated and configured based on the user account.

Figure 21:
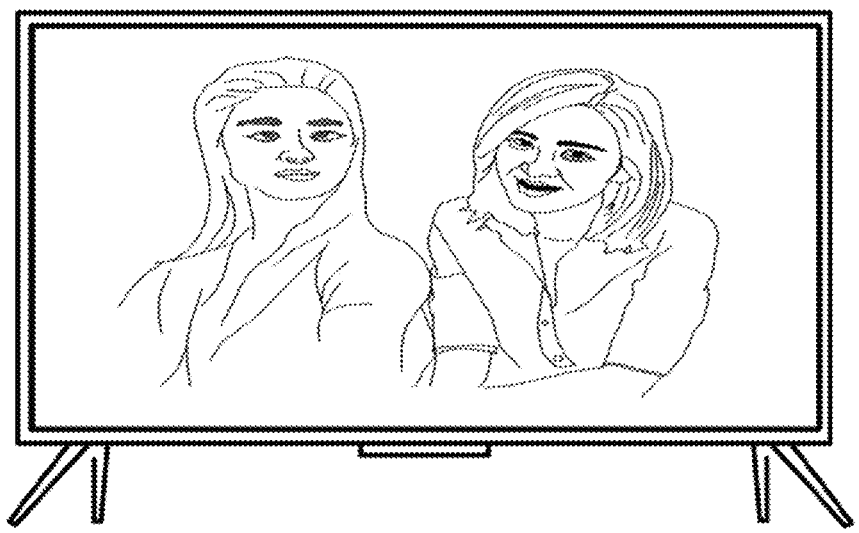
FIG. 21 is a first schematic diagram of a user interface according to some embodiments of the present application.
Figure 22:
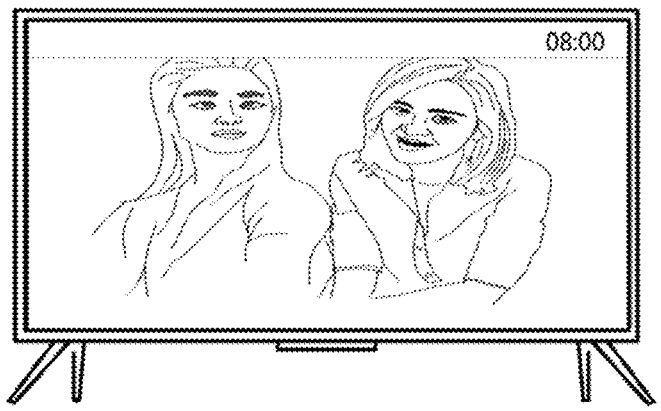
FIG. 22 is a second schematic diagram of a user interface according to some embodiments of the present application.

Referring to FIG. 3 again, the user may watch a video via the display apparatus 200, and the video may include a digital television program and a non-digital television program. The non-digital television program may be data content provided by a third-party application. While the display apparatus is playing the video, the user may control the display of the current time on a floating layer of a user interface via a control device. As shown in FIG. 21 which is a first schematic diagram of a user interface according to some embodiments of the present application, the display apparatus is playing a video, and in this case, the user can press a key on the control device to control the display of the current time on the floating layer of the user interface, as shown in FIG. 22. FIG. 22 is a second schematic diagram of a user interface according to some embodiments of the present application, showing the current time 8:00.

It is noted that the present application does not limit the manner in which the current time is displayed on the user interface. In one example, the current time may be displayed on a floating layer of the user interface and located in an upper right corner on the user interface. In some embodiments, the floating layer may be set as a transparent floating layer, which can reduce the influence on the user to watch the video when displaying the current time. In another example, it is possible to jump from the user interface on which the video is playing to another user interface, to display the current time on another user interface.

In the process of watching a video, the user often finds that there is a large gap in the current time displayed on the display apparatus when playing different videos, which reduces the user experience. For example, the current time displayed when playing a video A on the display apparatus is 8:00; and it is then switched to play a video B, and the current time displayed when playing the video B on the display apparatus is 10:00. The gap between the current time displayed when playing the video A and the current time displayed when playing the video B is large. Therefore, how to relieve the user's confusion caused by the large gap between the current time displayed when different videos are played on the display apparatus has become an urgent problem to be solved by the technicians in the field.

The reason for the large gap between the current time displayed when playing the video A and the current time displayed when playing the video B is that: when the user watches a non-digital television program, the time displayed on the display apparatus can be determined based on time zone information selected by the user on the display apparatus and the Universal Time Coordinated (UTC) time obtained from the server. When the user watches a digital television program, the time displayed on the display apparatus can be determined based on the time zone information and UTC time in the digital television program stream. The modes of determining the display time can be different when a digital television program is played and when a non-digital television program is played. Generally, in a single time zone country, the time displayed on the display apparatus is the same when playing a non-digital television program and a digital television program of this time zone. However, in a multi-time zone country, the display apparatus can receive and play digital television programs of different time zones in the country, which may result in that the current time displayed on the current display apparatus is determined by time zone information and UTC time in the digital television program streams corresponding to other time zones. Therefore, when switching between digital television programs corresponding to other time zones and the non-digital television program, the current time displayed on the display apparatus may have a large gap.

In order to solve the problem that a user is unable to distinguish a specific source of the currently displayed time, embodiments of the present application can provide a method for displaying time zone information. In this method, based on that the signal source of the display apparatus is a Digital Television (DTV) channel and a code stream exists in the DTV channel, a display state of a time zone setting control and a display state of a parameter setting control that are on the same first user interface can be set to be different, to prompt the user that the time currently displayed on the current display apparatus is determined by the content in the DTV program stream, so that the user can understand the source of the time currently displayed on the display apparatus.

Figure 23:
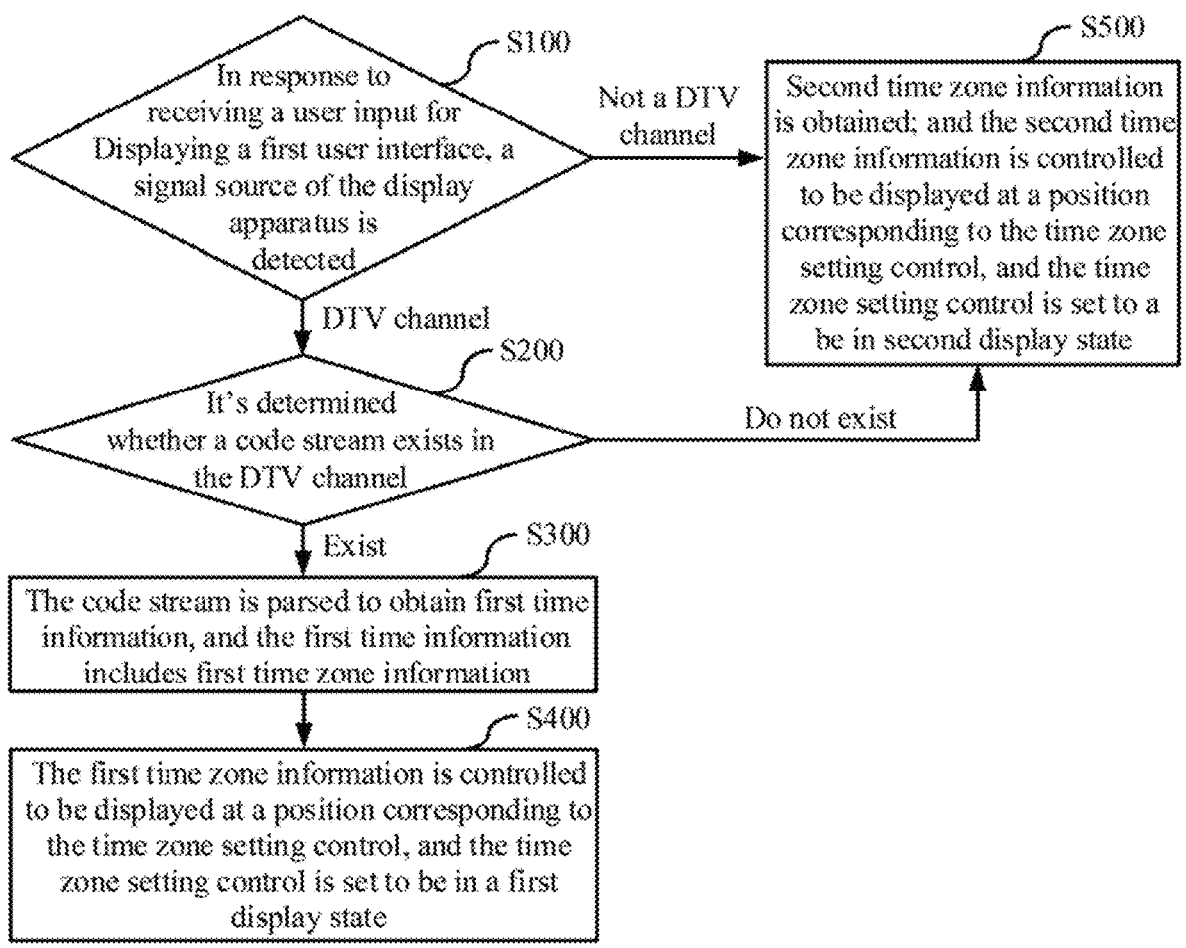
FIG. 23 is a flowchart of a method for displaying time zone information according to some embodiments of the present application.

As shown in FIG. 23, FIG. 23 is a flowchart of a method for displaying time zone information according to some embodiments of the present application. The method can include the following.

S100. In response to receiving a first command for displaying a first user interface, a signal source of the display apparatus is detected, where the first user interface includes a time zone setting control and a parameter setting control.

In some embodiments, signal sources may be an ATV video channel (receiving an analog signal), a DTV channel (receiving a digital signal), an Internet Protocol TV (IPTV) network channel and a High Definition Multimedia Interface (HDMI) channel, etc. The display apparatus may play videos from multiple sources. In embodiments of the present application, before the display apparatus displays the first user interface, a source of the currently played video can be determined by detecting the signal source, and how to display a time zone setting control in the first user interface can further be determined.

Figure 24:
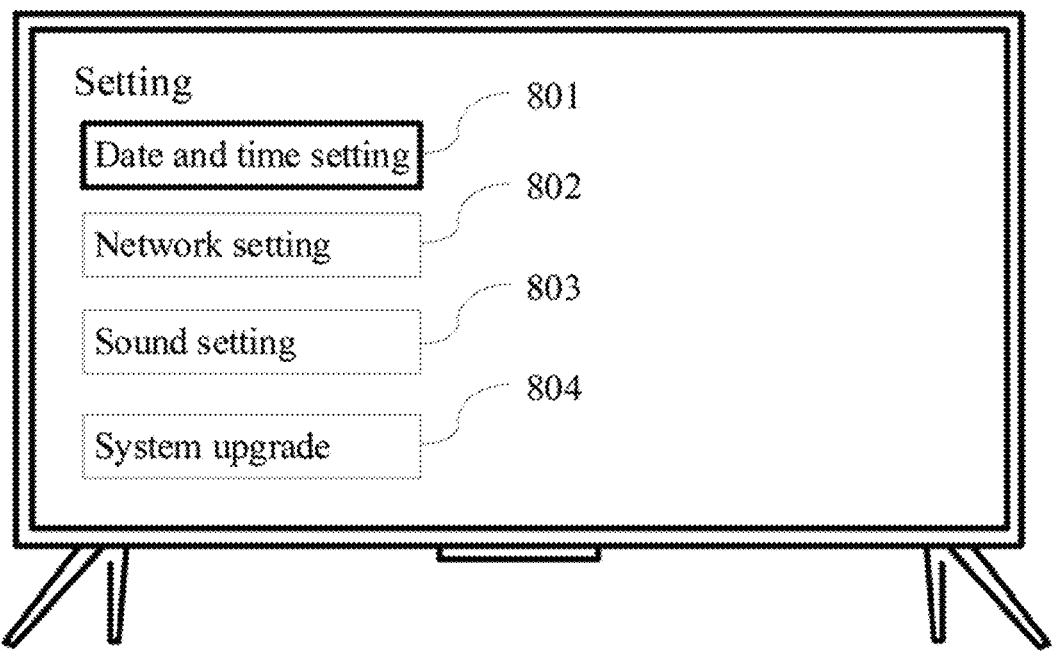
FIG. 24 is a schematic diagram of a second user interface according to some embodiments of the present application.
Figure 25:
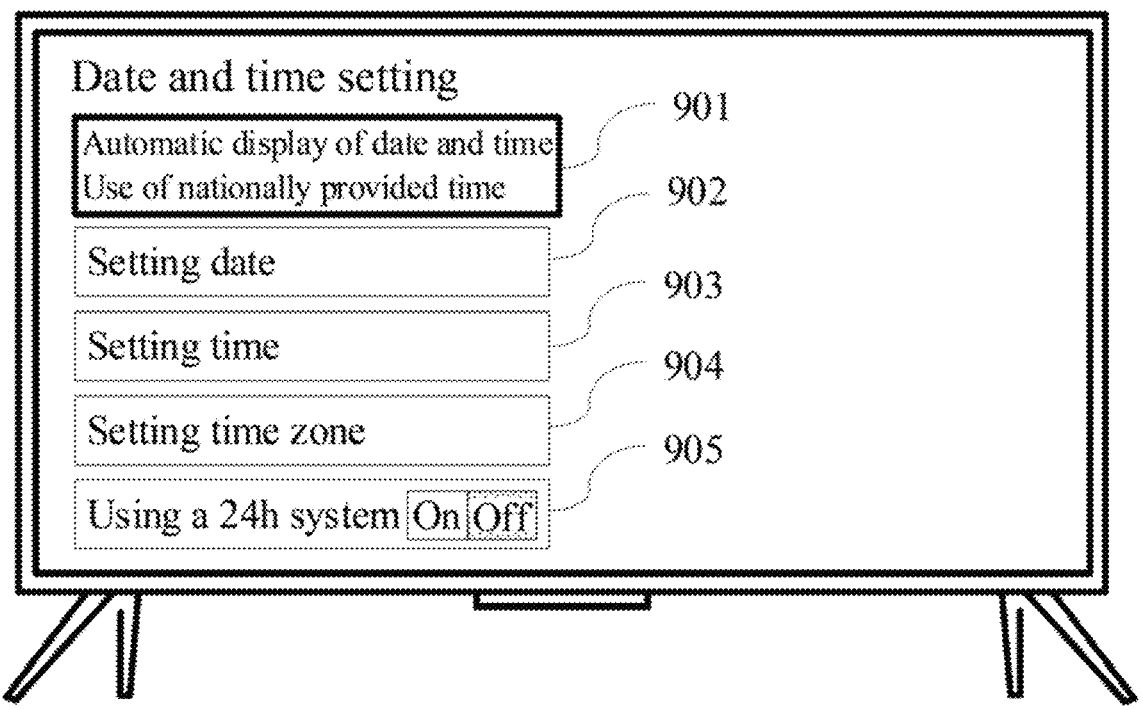
FIG. 25 is a first schematic diagram of a first user interface according to some embodiments of the present application.

In some embodiments, the first command for displaying the first user interface may be accomplished through the following: a second user interface is displayed on the display apparatus, and a date and time setting control is displayed on the second user interface. For example, as shown in FIG. 24, which is a schematic diagram of a second user interface according to some embodiments of the present application, the second user interface in FIG. 24 can display a date and time setting control 801, a network setting control 802, a sound setting control 803, and a system upgrade control 804. The user may move a focus to the date and time setting control 801 via the control device and press a confirmation key on the control device, and in this case, the user interface can jump to the first user interface, as shown in FIG. 25. FIG. 25 is a first schematic diagram of a first user interface according to some embodiments of the present application, in which the first user interface can display a control of automatic display of the date and time 901, a setting date control 902, a setting time control 903, a time zone setting control 904 and a control of using a 24 h system 905. The remaining controls on the first user interface except for the time zone setting control 904 are parameter setting controls.

S200. After detecting the signal source, based on that the signal source is a first channel, it's determined whether a code stream exists in the first channel.

In the embodiments of the present application, the first channel may be a DTV channel. In the embodiments of the present application, based on that the signal source is a first channel, it is determined that there is a possibility that the display apparatus is playing a digital television program. Based on that the display apparatus is playing a digital television program, a code stream must exist in the first channel. Therefore, in order to determine whether the display apparatus is currently playing a digital television program, based on that the signal source is the first channel, it can continue to determine whether a code stream exists in the first channel.

S300. Based on that the signal source is the first channel and a code stream exists in the first channel, the code stream is parsed to obtain first time information, where the first time information includes first time zone information.

In some embodiments, the code stream can include video data and first time information, etc. The display apparatus can parse the received code stream and play the corresponding video content. In addition, the first time information in the code stream corresponds to time zone information to which the digital television program belongs, first time information in the code streams corresponding to digital television programs in different time zones is different, and the first time information includes first time zone information.

S400. The first time zone information is controlled to be displayed at a position corresponding to the time zone setting control, and the time zone setting control is set to be in a first display state and the parameter setting control is set to be in a second display state, to distinguish the time zone setting control and the parameter setting control via the first display state and second display state.

In embodiments of the present application, in order to facilitate the user to understand a source of the current time displayed on the display apparatus, based on that the signal source of the display apparatus is a first channel and a code stream exists in the first channel, the first display state of the time zone setting control can be controlled to be different from the second display state of the parameter setting control.

In some embodiments, setting the time zone setting control to the first display state can include the following: the time zone setting control is located between two parameter setting controls; and in response to receiving a fourth command for moving a focus in a direction from a parameter setting control on one side of the time zone setting control to the time zone setting control, the focus is controlled to move directly to a parameter setting control on the other side of the time zone setting control.

Figure 26:
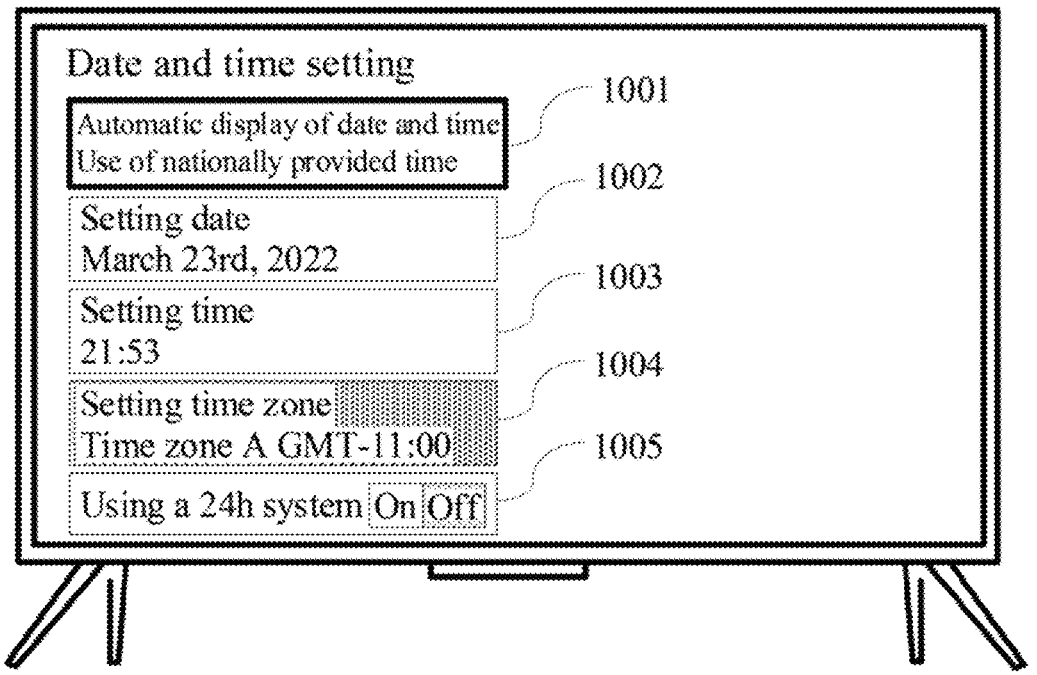
FIG. 26 is a second schematic diagram of a first user interface according to some embodiments of the present application.

As shown in FIG. 26, based on that the focus is on a setting time control 1003, the user can press a key on the control device, such as a "down key", and then the focus can move directly to a control of using a 24 h system 1005.

In some embodiments, the second display state is that the focus can be moved to the control. For example, in FIG. 26, based on that the focus is on a setting date control 1002, the user can press a key on the control device, such as a "down key", and then the focus can move down to a setting time control 1003.

In some embodiments, only two controls are provided on the first user interface, including a parameter setting control, and a time zone setting control below the parameter setting control.

In response to receiving a sixth command for a focus to move from the parameter setting control towards the time zone setting control, the focus can be controlled not to move, i.e. the focus will not be on the time zone setting control.

In some embodiments, setting the time zone setting control to the first display state can include: not performing an operation of selecting the time zone setting control in response to receiving a fifth command for selecting the time zone setting control.

As shown in FIG. 26, when the user moves a focus to a time zone setting control 1004 and presses a confirmation key on the control device, the fifth command for selecting the time zone setting control can be generated, but the first user interface does not change.

In some embodiments, the second display state is that a control is selected and an operation corresponding to the selected control is performed. For example, as shown in FIG. 26, when the user moves a focus to a setting date control 1002 by the control device and presses a confirmation key on the control device, the setting date control can be selected, and a corresponding operation can be performed in this case. For example, the date corresponding to the setting date control can be modified, i.e., "Mar. 23, 2022" can be modified as needed.

In some embodiments, based on that the time zone setting control is in a first display state, the first time zone information displayed at a position corresponding to the time zone setting control cannot be changed.

It is noted that when jumping to a first user interface displaying the first time zone information, the first time zone information displayed can be the currently locally stored time zone information. In some embodiments, based on that the user has not changed the first time zone information, the locally stored time zone information can be the initially set time zone information. Based on that the user changes the first time zone information before jumping to the first user interface, the locally stored time zone information can be the time zone information after the last change by the user.

In some embodiments, based on that a control is set to be in the first display state, it can further include: graying out the time zone setting control, i.e., displaying a pure gray image at a position corresponding to the time zone setting control. An area of the pure gray image may be the same as an area occupied by the time zone setting control.

In some embodiments, the color transparency of the pure gray image can be set to a certain value, so that the user can see the first time zone information displayed at the position corresponding to the time zone setting control through the pure gray image with the color transparency of a certain value. The first time zone information cannot be changed, to facilitate the user to understand the first time zone information set in the display apparatus.

In some embodiments, a Greenwich Mean Time (GMT) corresponding to the first time zone information may also be displayed at the position corresponding to the time zone setting control. For example, as shown in FIG. 26, which is a second schematic diagram of a first user interface according to some embodiments of the present application, the time zone setting control 1004 is grayed out, the first time zone information includes a time zone A, and the user interface in FIG. 26 also shows that the GMT time corresponding to the time zone A is 11:00. The display of the GMT time may help the user to understand the current time corresponding to the first time zone information.

Figure 27:
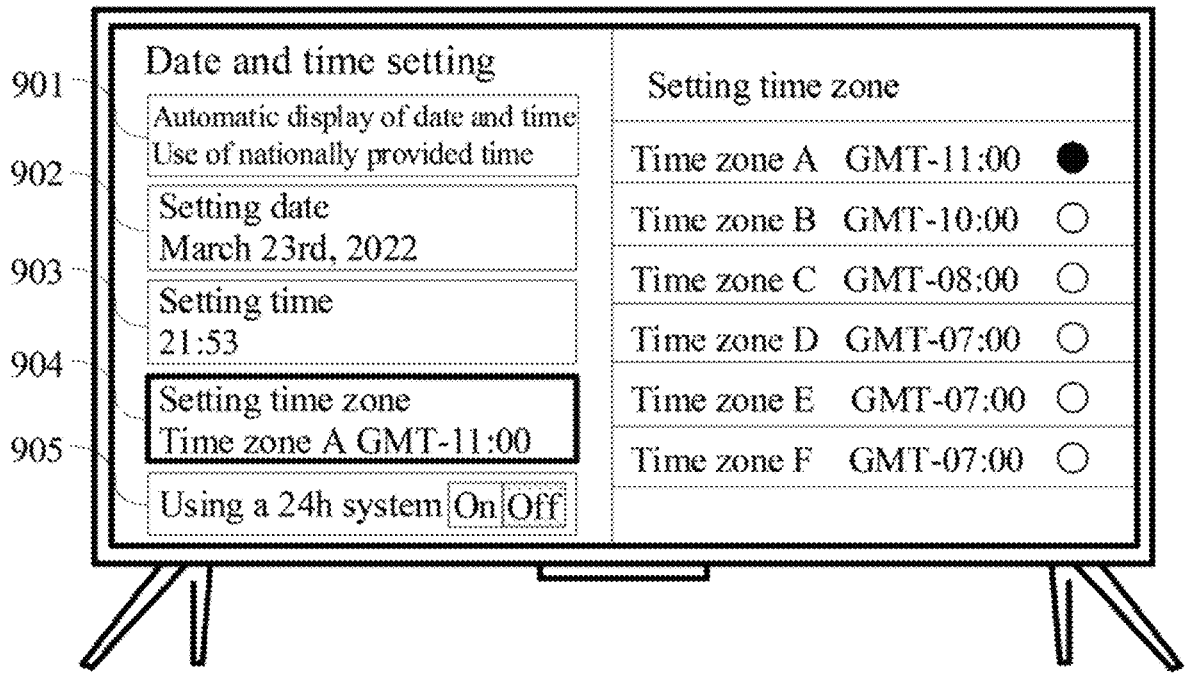
FIG. 27 is a third schematic diagram of a first user interface according to some embodiments of the present application.

In some embodiments, based on that the time zone setting control is set to be in the second display state, the first time zone information displayed at a position corresponding to the time zone setting control may be changed, and the user may move a focus to the time zone setting control via the control device and press a confirmation key on the control device. In this case, the first user interface can also display to-be-selected time zone controls, and each to-be-selected time zone control can correspond to one piece of time zone information. For example, as shown in FIG. 25, the user may move a focus to the time zone setting control via the control device and press a confirmation key on the control device, and in this case, the user interface can change to the first user interface as shown in FIG. 27, which is a third schematic diagram of the first user interface according to some embodiments of the present application. A plurality of to-be-selected time zone controls can be displayed at one side of the first user interface shown in FIG. 27, and the time zone information displayed at positions corresponding to the plurality of to-be-selected time zone controls can be time zone information A, time zone information B, time zone information C, time zone information D, time zone information E, and time zone information F. The user can move a focus to a to-be-selected time zone control via the control device and press a confirmation key on the control device; and in this case, the locally stored time zone information can be changed and the changed time zone information can be controlled to be displayed at a position corresponding to the time zone setting control.

In some embodiments, based on that the time zone setting control is in the second display state, the user can move a focus to the time zone setting control via the control device and press a confirmation key on the control device, and in this case, the user can change first time zone information displayed at a position corresponding to the time zone setting control via an up key or a down key on the control device.

Figure 28:
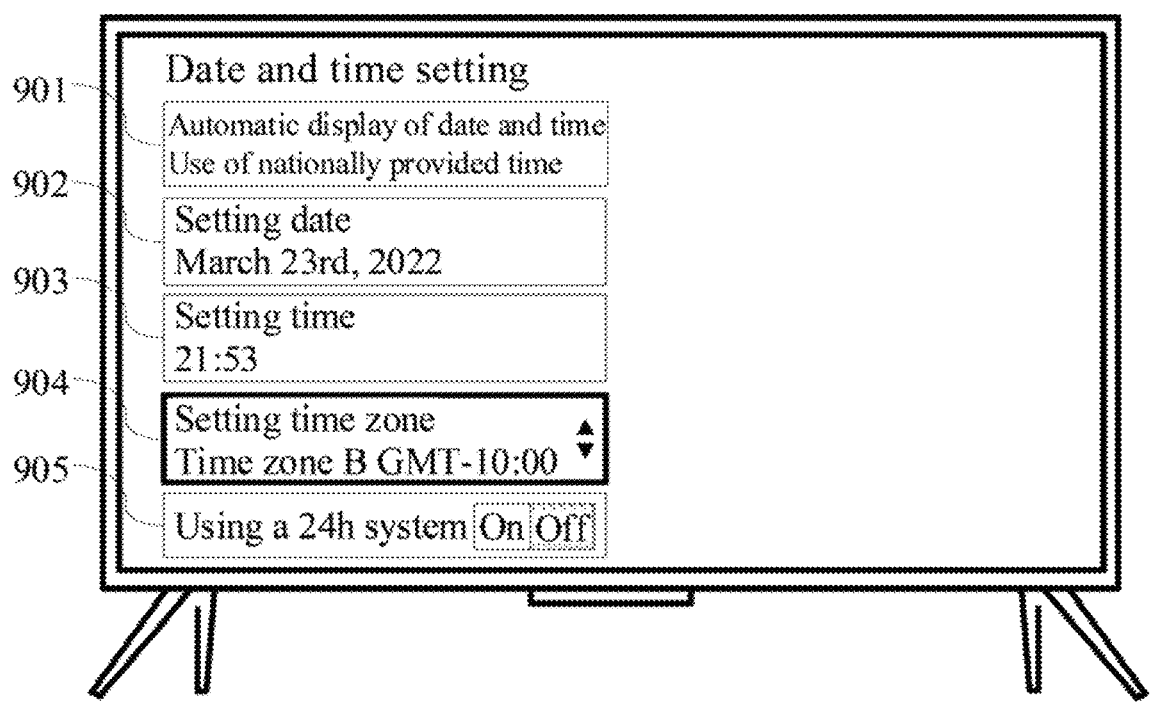
FIG. 28 is a fourth schematic diagram of a first user interface according to some embodiments of the present application.
Figure 29:
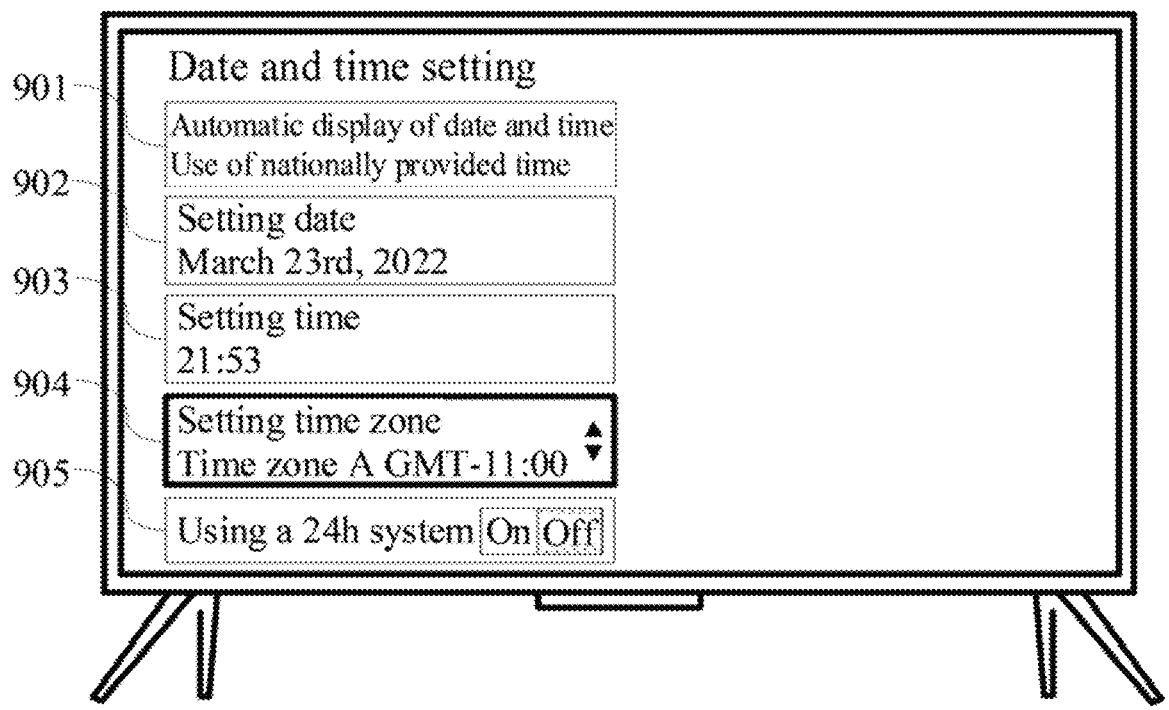
FIG. 29 is a fifth schematic diagram of a first user interface according to some embodiments of the present application.
Figure 30:
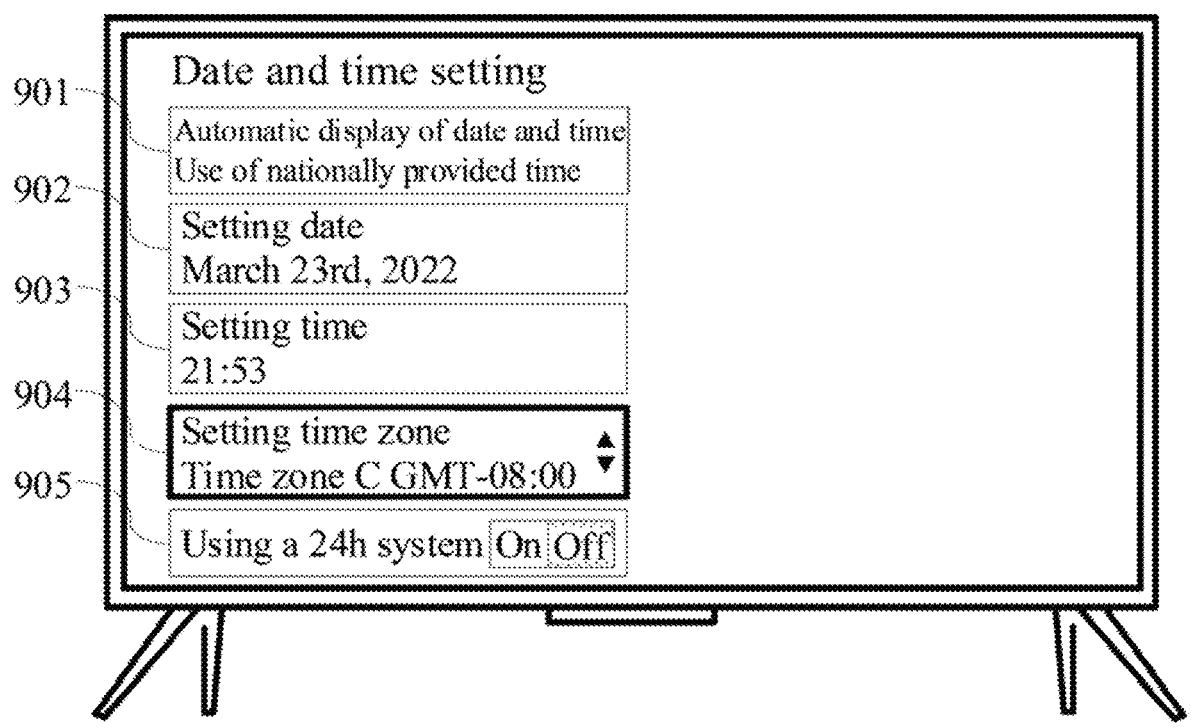
FIG. 30 is a sixth schematic diagram of a first user interface according to some embodiments of the present application.

As shown in FIG. 28, which is a fourth schematic diagram of the first user interface according to some embodiments of the present application, the time zone information B can be displayed at a position corresponding to the time zone setting control. When the user presses the up key on the control device, the content displayed at the position corresponding to the time zone setting control can be changed to: the time zone information A, for example, as shown in FIG. 29, which is a fifth schematic diagram of a first user interface according to some embodiments of the present application. In FIG. 28, when the user presses the down key on the control device, the content displayed at the position corresponding to the time zone setting control can be changed to the time zone information C, for example, as shown in FIG. 30, which is a sixth schematic diagram of a first user interface according to some embodiments of the present application.

In some embodiments, after the user presses the up key or the down key on the control device to change the first time zone information displayed at the position corresponding to the time zone setting control, the time zone information displayed on the display is not immediately used to re-calculate the time displayed on the display apparatus, but rather, the time displayed on the display is used to calculate the time displayed on the display apparatus only after a preset time in which no further change of the first time zone information displayed at the position corresponding to the time zone setting control is received. The time zone information displayed on the display can be used to calculate the time displayed on the display apparatus. In other words, in the process that the user rapidly presses the up key or the down key, the time zone information that is rapidly changed in the process is not used to calculate the time displayed on the display apparatus. The changed time zone information can be used to calculate the time displayed on the display apparatus only after the changed time zone information remains on the display for the preset time.

It is to be noted that moving the focus to the control may cause a border of the control to be thickened in the embodiments of the present application. In addition, other forms may be used to indicate that the control is selected. For example, when the focus is moved to the control, a shape of the control may be changed, from a square to a circle and so on. The control may also be enlarged according to a preset ratio when the control is selected, for example, the to-be-selected time zone controls on the user interface can have the same display area, and when a control is selected, a display area of the control can be 1.2 times larger than an original display area of the control. Since the present application does not limit the form of the control when the focus is on the control, other forms that can be used for easily distinguishing the to-be-selected control by the user are acceptable.

In the embodiments of the present application, a source of the video can be distinguished by setting the time zone setting control to be in a first display state. When the video is a digital television program, the first time zone information displayed on the display apparatus can be obtained by code stream parsing. When the user sees that the zone setting control is in the first display state, it can be determined that the current broadcast is a digital television program, and at the same time, the user can understand a source of the time currently displayed on the display apparatus.

In some embodiments, based on that the signal source is not a first channel, S500 can be executed: obtaining second time zone information, where the second time zone information is locally stored time zone information; and controlling the second time zone information to be displayed at a position corresponding to the time zone setting control, and setting the time zone setting control to be in a second display state, and the second time zone information displayed at a position corresponding to the time zone setting control may be changed.

In embodiments of the present application, based on that the signal source is not a first channel, it's indicated that the video currently played on the display apparatus is not a digital television program, then the locally stored second time zone information can be directly displayed at the position corresponding to the time zone setting control on the first user interface, and the second time zone information displayed at the position corresponding to the time zone setting control may be changed. For example, as shown in FIG. 25, the time zone setting control can be in a second display state, and the second time zone information displayed at the position corresponding to the time zone setting control may be changed.

In some embodiments, in response to receiving a second command for changing the second time zone information displayed at the corresponding position of the time zone setting control to third time zone information, the locally stored time zone information can be changed from the second time zone information to the third time zone information. In embodiments of the present application, based on that the time zone setting control is in a second display state and the second time zone information displayed at the corresponding position of the time zone setting control can be changed, the user can change the second time zone information to the third time zone information via the control device. In the embodiments of the present application, the user may change the second time zone information displayed at the corresponding position of the time zone setting control according to personal needs. For example, as shown in FIG. 27, the user can select a to-be-selected time zone control from a plurality of to-be-selected time zone controls via the control device, and press a confirmation key on the control device, and in this case, the time zone information corresponding to the to-be-selected time zone control which is selected can be used as the third time zone information.

At the same time, the second time zone information displayed on the first user interface can be changed to the third time zone information.

In some embodiments, based on that no code stream exists in the first channel, S500 can be executed: obtaining second time zone information; and controlling the second time zone information to be displayed at a position corresponding to the time zone setting control, and setting the time zone setting control to be in a second display state, where the second time zone information displayed at the position corresponding to the time zone setting control may be changed.

In embodiments of the present application, based on that no code stream exists in the first channel, it is not possible to use the time information in the code stream to determine the first time zone information displayed on the first user interface; and thus the locally stored second time zone information can be obtained, and the locally stored second time zone information can be directly displayed at the position corresponding to the time zone setting control on the first user interface.

In some embodiments, when the display apparatus is powered on, a signal source of the display apparatus can be detected.

Based on that the signal source is a first channel, it's determined whether a code stream exists in the first channel. Based on that a code stream exists in the first channel, the code stream can be parsed to obtain first time information; and based on the first time information, the current time can be calculated and obtained.

Daylight saving time (DST) exists in some time zones and daylight saving time does not exist in some time zones. Therefore, in some time zones, the first time information parsed from the code stream can include first time zone information, first UTC time and first daylight saving time; and in other time zones, the first time information parsed from the code stream can include only first time zone information and first UTC time.

In some embodiments, based on that the first time information obtained by parsing includes the first time zone information, the first UTC time and the first daylight saving time, calculating the current time based on the first time information can include: determining a first offset time corresponding to the first time zone information. In some embodiments, the first offset time corresponding to the first time zone information may be obtained directly from the code stream. In other embodiments, the first offset time corresponding to the first time zone information may be determined from a server or from a locally stored correspondence between the first time zone information and the first offset time in advance.

The first offset time, the first UTC time, and the first daylight saving time can be summed to obtain the current time. For example, the first offset time is −2:00, the first UTC time is 10:00, and the first daylight saving time is 2:00; and then the current time can be a sum of the above three, which is 10:00.

In some embodiments, based on that the first time information obtained by parsing includes the first time zone information and the first UTC time, calculating the current time based on the first time information can include: determining a first offset time corresponding to the first time zone information, and summing the first offset time and the first UTC time to obtain the current time. For example, the first offset time is −2:00 and the first UTC time is 10:00; and then the current time can be a sum of the above two, which is 8:00.

In some embodiments, after detecting a signal source of the display apparatus when the display apparatus is powered on, the method can further include: obtaining second time information based on that the signal source is not the first channel, where the obtained second time information includes a second UTC time, locally stored time zone information and a second daylight saving time corresponding to the locally stored time zone information, or includes a second UTC time and locally stored time zone information, where the second UTC time is determined according to a networking state of the display apparatus; and calculating and obtaining the current time based on the second time information.

In embodiments of the present application, some time zones have the corresponding daylight saving time and some time zones do not have the corresponding daylight saving time, so whether the second time information includes a second daylight saving time can be related to the locally stored time zone information. Therefore, in some time zones, the second time information can include a second UTC time, locally stored time zone information, and a second daylight saving time corresponding to the locally stored time zone information. In some other time zones, the second time information can include a second UTC time and locally stored time zone information.

In some embodiments, the step of determining the second UTC time can include: determining whether the display apparatus is connected to a network. In embodiments of the present application, whether the display apparatus is connected to a network can be understood as whether the display apparatus accesses the Internet. In some embodiments, the display apparatus may access the Internet via wifi or the like.

Based on that the display apparatus is connected to a network, a third UTC time can be obtained from a server. In embodiments of the present application, the third UTC time can be pre-stored in the server. Based on that the display apparatus is connected to a network, the pre-stored third UTC time can directly be obtained from the server.

It is detected whether the third UTC time is successfully obtained; and based on that the third UTC time is successfully obtained, the third UTC time can be set to a second UTC time. In embodiments of the present application, based on that the display apparatus successfully receives the third UTC time sent from the server, the display apparatus can take the third UTC time as the second UTC time.

Based on that a second daylight saving time exists in the second time information, the current time can be calculated by using the third UTC time, the locally stored time zone information, and the second daylight saving time corresponding to the locally stored time zone information. Based on that a second daylight saving time does not exist in the second time information, the current time can be calculated by using the third UTC time and the locally stored time zone information. In the embodiments of the present application, a step of calculating the current time based on the second time information can be the same as the step of calculating the current time based on the first time information, and will not be repeated herein.

Based on that the display apparatus is not connected to a network, or the third UTC time is not successfully obtained, the locally stored fourth UTC time can be set to the second UTC time.

In the embodiments of the present application, the display apparatus may not access the Internet, or the third UTC time may not be successfully sent from the server to the display apparatus due to network interruption or the like. In this case, the locally stored fourth UTC time can be set to the second UTC time. Based on that a second daylight saving time exists in the second time information, the current time can be calculated by using the fourth UTC time, the locally stored time zone information, and the second daylight saving time corresponding to the locally stored time zone information. Based on that a second daylight saving time does not exist in the second time information, the current time can be calculated by using the fourth UTC time and the locally stored time zone information. In embodiments of the present application, a step of calculating the current time based on the second time information including the fourth UTC time can be the same as the step of calculating the current time based on the second time information including the third UTC time, and will not be repeated herein.

In some embodiments, after the signal source is a first channel when the display apparatus is powered on, the method can further include: obtaining second time information based on that no code stream exists in the first channel; and calculating and obtaining the current time based on the second time information. In the embodiments of the present application, the specific process of calculating and obtaining the current time according to the second time information has been described above and will not be repeated herein.

In some embodiments, in response to receiving a third command for switching the signal source, it is detected whether the switched signal source is the first channel. In some embodiments, the user may switch the signal source on the user interface via the control device. For example, the user may press a preset key on the control device to control a list of signal sources to be displayed on a floating layer of the user interface, the list of signal sources includes selectable signal source controls, and the selectable signal source controls correspond one-to-one with the signal sources. The user can move the focus to the selectable signal source control via the control device and press the confirmation key on the control device, and in this case, the signal source can be switched.

Figure 31:
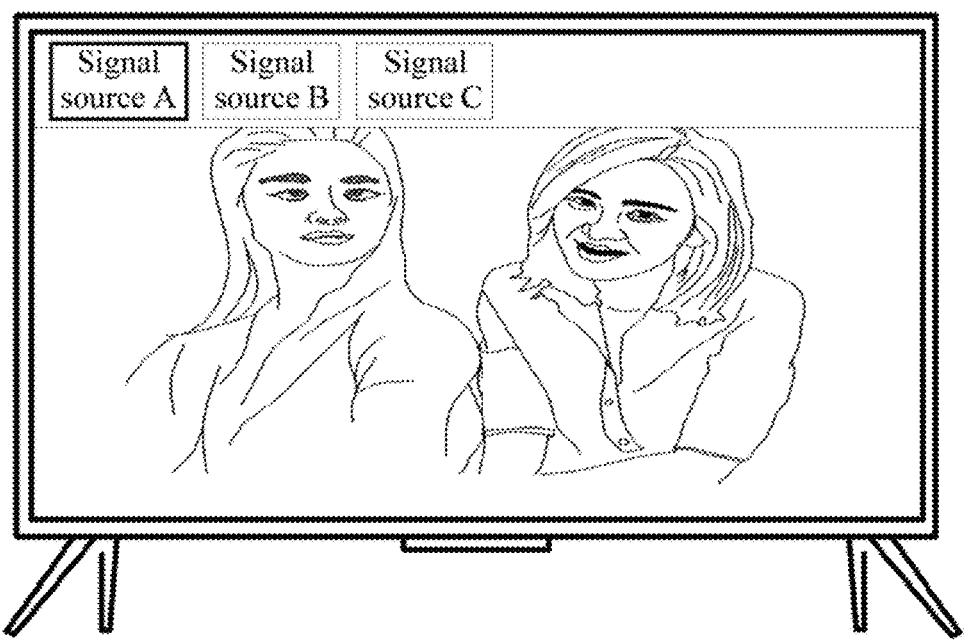
FIG. 31 is a third schematic diagram of a user interface according to some embodiments of the present application.

As shown in FIG. 31, FIG. 31 is a third schematic diagram of a user interface according to embodiments of the present application. A list of signal sources can be displayed on the user interface in FIG. 31, including three selectable signal source controls, namely, a signal source A, a signal source B and a signal source C, where the signal source A corresponds to the first channel. The user may move the focus to the selectable signal source control corresponding to the signal source A via the control device and press the confirmation key on the control device, and in this case, the signal source can be switched to the first channel.

In some embodiments, based on that the signal source after being switched is the first channel, it is determined whether a code stream exists in the first channel. Based on that a code stream exists, the code stream can be parsed to obtain first time information; and based on the first time information, the current time can be calculated. Based on that the signal source after being switched is not the first channel, second time information can be obtained; and based on the second time information, the current time can be calculated and obtained. Based on that no code stream exists in the first channel, the second time information can be obtained; and based on the second time information, the current time can be calculated and obtained. In embodiments of the present application, the process of calculating the current time based on the first time information, and the process of calculating the current time based on the second time information have been described above, and will not be repeated.

The embodiments of the present application can further provide a display apparatus, including: a display configured to display an image and/or a user interface from a broadcast system or a network; a modem; a communication device configured to be connected with a control device and/or a network; a user input interface configured to receive input signals; a memory configured to store computer instructions; and a processor connected to the memory, the display and the user input interface respectively, and configured to run the computer instructions to cause the display apparatus to execute: detecting a signal source of the display apparatus in response to receiving a first command for displaying a first user interface, where the first user interface includes a time zone setting control and at least one parameter setting control; determining whether a code stream exists in the first channel based on that the signal source is a first channel; based on that a code stream exists in the first channel, parsing the code stream to obtain first time information, where the first time information includes first time zone information; controlling the first time zone information to be displayed at a position corresponding to the time zone setting control, and setting the time zone setting control to be in a first display state and the parameter setting control to be in a second display state, to distinguish the time zone setting control and the parameter setting control via the first display state and the second display state.

In the above embodiments, a display apparatus and a processing method for the display apparatus are provided, and the method is a method for displaying time zone information provided in the above embodiments. In the method, based on that the signal source of the display apparatus is a DTV channel and a code stream exists in the DTV channel, the display states of the time zone setting control and the parameter setting control which are on the same first user interface can be set to be different, to prompt the user that the current time displayed on the display apparatus is determined by the content in the digital television program stream, so that the user understands the source of the time currently displayed on the display apparatus. The method can include: detecting a signal source of the display apparatus in response to receiving a first command for displaying a first user interface, where the first user interface includes a time zone setting control and at least one parameter setting control; determining whether a code stream exists in the first channel based on that the signal source is a first channel; based on that a code stream exists in the first channel, parsing the code stream to obtain first time information, where the first time information includes first time zone information; and controlling the first time zone information to be displayed at a position corresponding to the time zone setting control, and setting the time zone setting control to be in a first display state and the parameter setting control to be in a second display state, to distinguish the time zone setting control and the parameter setting control via the first display state and second display state.

For ease of explanation, the above description has been made in combination with specific implementation modes. However, the above discussion in some embodiments is not intended to be exhaustive or to limit the implementation modes to the specific forms disclosed above. A variety of modifications and deformations can be obtained according to the above teachings. The above implementation modes are selected and described for the purpose of better explaining the present disclosure, so that those skilled in the art can better use the implementation modes.

What is claimed is:

1. A display apparatus, comprising:
a display configured to display an image from a broadcast system or network and/or a user interface;
a modem;
a communication device configured to communicate with an external device;
a user input interface configured to receive an input signal; and
at least one processor in connection with the display, the modem, the communication device and the user input interface and configured to execute instructions to cause the display apparatus to:
detect a signal source of the display apparatus when the display apparatus is powered on; based on that the signal source is a first channel, determine whether a code stream exists in the first channel;
based on that a code stream exists in the first channel, parse the code stream to obtain first time information, wherein the first time information comprises first time zone information, a first Universal Time Coordinated (UTC) time and a first daylight saving time, or the first time information comprises first time zone information and a first UTC time; wherein the first channel is a Digital Television (DTV) channel;
based on that the first time information comprises the first time zone information, the first UTC time and the first daylight saving time, determine a first offset time corresponding to the first time zone information, and sum the first offset time, the first UTC time and the first daylight saving time, to obtain a current time;
based on that the first time information comprises the first time zone information and the first UTC time, determine a first offset time corresponding to the first time zone information, and sum the first offset time and the first UTC time, to obtain a current time;
in response to receiving a first command for displaying a first user interface, detect the signal source of the display apparatus, wherein the first user interface comprises a time zone setting control and at least one parameter setting control;
control the first time zone Information to be displayed at a position corresponding to the time zone setting control, and set the time zone setting control to be in a first display state and the parameter setting control to be in a second display state, to distinguish the time zone setting control and the parameter setting control via the first display state and the second display state;
wherein the time zone setting control is located between two parameter setting controls;
in response to receiving a fourth command for moving a focus in a direction from a parameter setting control at one side of the time zone setting control to the time zone setting control, control the focus to move directly to a parameter setting control at the other side of the time zone setting control;
wherein the at least one processor is further configured to execute instructions to cause the display apparatus to:
in response to receiving a fifth command for selecting the time zone setting control, not perform an operation of selecting the time zone setting control;
based on that the signal source Is not the first channel, obtain second time zone information, wherein the second time zone information is locally stored time zone information; and
control the second time zone information to be displayed at the position corresponding to the time zone setting control, and set the time zone setting control to be in the second display state;
based on that no code stream exists in the first channel, obtain second time zone information; and
control the second time zone information to be displayed at the position corresponding to the time zone setting control, and set the time zone setting control to be in the second display state.

2. The display apparatus according to claim 1, wherein the at least one processor is further configured to execute instructions to cause the display apparatus to:

based on that the signal source is not the first channel, obtain second time information, wherein the second time information comprises a second UTC time, locally stored time zone information, and a second daylight saving time corresponding to the locally stored time zone information; or the second time information comprises a second UTC time and locally stored time zone information; wherein the second UTC time is determined according to a networking state of the display apparatus;

based on that the second time information comprises the second UTC time, the locally stored time zone information and the second daylight saving time, determine a second offset time corresponding to the locally stored time zone information; and sum the second UTC time, the second offset time and the second daylight saving time, to obtain a current time;

based on that the second time information comprises the second UTC time and the locally stored time zone information, determine a second offset time corresponding to the locally stored time zone information; and sum the second UTC time and the second offset time, to obtain a current time.

3. The display apparatus according to claim 2, wherein the at least one processor is further configured to execute instructions to cause the display apparatus to:

based on that that no code stream exists in the first channel, obtain second time information, wherein the second time information comprises a second UTC time, locally stored second time zone information, and a second daylight saving time corresponding to the locally stored time zone information, or the second time information comprises a second UTC time and locally stored time zone information, wherein the second UTC time is determined based on the networking state of the display apparatus;

based on that the second time information comprises the second UTC time, the locally stored time zone information and the second daylight saving time, determine a second offset time corresponding to the locally stored time zone information; and sum the second UTC time, the second offset time and the second daylight saving time, to obtain a current time;

based on that the second time information comprises the second UTC time and the locally stored time zone information, determine a second offset time corresponding to the locally stored time zone information; and sum the second UTC time and the second offset time, to obtain a current time.

4. The display apparatus according to claim 3, wherein the at least one processor is further configured to execute instructions to cause the display apparatus to:

determine whether the display apparatus is connected to a network; based on that the display apparatus is connected to a network, obtain a third UTC time from a server; detect whether the third UTC time is successfully obtained; and based on that the third UTC time is successfully obtained, set the third UTC time as the second UTC time;

based on that the display apparatus is not connected to a network, or the third UTC time is not successfully obtained, set a locally stored fourth UTC time as the second UTC time.

5. The display apparatus according to claim 2, wherein the at least one processor is further configured to execute instructions to cause the display apparatus to:

determine whether the display apparatus is connected to a network; based on that the display apparatus is connected to a network, obtain a third UTC time from a server; detect whether the third UTC time is successfully obtained; and based on that the third UTC time is successfully obtained, set the third UTC time as the second UTC time;

based on that the display apparatus is not connected to a network, or the third UTC time is not successfully obtained, set a locally stored fourth UTC time as the second UTC time.

6. A method for displaying time zone information, comprising:

detecting a signal source of a display apparatus when the display apparatus is powered on;

based on that the signal source is a first channel, determining whether a code stream exists in the first channel;

based on that a code stream exists in the first channel, parsing the code stream to obtain first time information, wherein the first time information comprises first time zone information, a first Universal Time Coordinated (UTC) time and a first daylight saving time, or the first time information comprises first time zone information and a first UTC time; wherein the first channel is a Digital Television (DTV) channel;

based on that the first time information comprises the first time zone information, the first UTC time and the first daylight saving time, determining a first offset time corresponding to the first time zone information, and summing the first offset time, the first UTC time and the first daylight saving time, to obtain a current time;

based on that the first time information comprises the first time zone information and the first UTC time, determining a first offset time corresponding to the first time zone information, and sum the first offset time and the first UTC time, to obtain a current time;

In response to receiving a first command for displaying a first user interface, detecting the signal source of the display apparatus, wherein the first user interface comprises a time zone setting control and at least one parameter setting control;

controlling the first time zone information to be displayed at a position corresponding to the time zone setting control, and setting the time zone setting control to be in a first display state and the parameter setting control to be in a second display state, to distinguish the time zone setting control and the parameter setting control via the first display state and the second display state;

wherein the time zone setting control is located between two parameter setting controls;

in response to receiving a fourth command for moving a focus in a direction from a parameter setting control at one side of the time zone setting control to the time zone setting control, controlling the focus to move directly to a parameter setting control at the other side of the time zone setting control;

in response to receiving a fifth command for selecting the time zone setting control, not performing an operation of selecting the time zone setting control;

based on that the signal source is not the first channel, obtaining second time zone information, wherein the second time zone information is locally stored time zone information; and controlling the second time zone information to be displayed at the position corresponding to the time zone setting control, and setting the time zone setting control to be in the second display state;

based on that no code stream exists in the first channel, obtaining second time zone Information; and controlling the second time zone information to be displayed at the position corresponding to the time zone setting control, and setting the time zone setting control to be in the second display state.

7. The method according to claim 6, wherein after the display apparatus is powered on and the signal source of the display apparatus is detected, the method further comprises:

based on that the signal source is not the first channel, obtaining second time information, wherein the second time information comprises a second UTC time, locally stored time zone information, and a second daylight saving time corresponding to the locally stored time zone information; or the second time information comprises a second UTC time and locally stored time zone information; wherein the second UTC time is determined according to a networking state of the display apparatus;

based on that the second time information comprises the second UTC time, the locally stored time zone information and the second daylight saving time, determining a second offset time corresponding to the locally stored time zone information; and summing the second UTC time, the second offset time and the second daylight saving time, to obtain a current time;

based on that the second time information comprises the second UTC time and the locally stored time zone information, determining a second offset time corresponding to the locally stored time zone information; and summing the second UTC time and the second offset time, to obtain a current time.

8. The method according to claim 7, wherein after the display apparatus is powered on and the signal source is detected to be the first channel, the method further comprises:

based on that that no code stream exists in the first channel, obtaining second time information, wherein the second time information comprises a second UTC time, locally stored second time zone information, and a second daylight saving time corresponding to the locally stored time zone information, or the second time information comprises a second UTC time and locally stored time zone information, wherein the second UTC time is determined based on the networking state of the display apparatus;

based on that the second time information comprises the second UTC time, the locally stored time zone information and the second daylight saving time, determining a second offset time corresponding to the locally stored time zone information; and summing the second UTC time, the second offset time and the second daylight saving time, to obtain a current time;

based on that the second time information comprises the second UTC time and the locally stored time zone information, determining a second offset time corresponding to the locally stored time zone information; and summing the second UTC time and the second offset time, to obtain a current time.

9. The method according to claim 8, further comprising:

determining whether the display apparatus is connected to a network; based on that the display apparatus is connected to a network, obtaining a third UTC time from a server; detecting whether the third UTC time is successfully obtained; and based on that the third UTC time is successfully obtained, setting the third UTC time as the second UTC time;

based on that the display apparatus is not connected to a network, or the third UTC time is not successfully obtained, setting a locally stored fourth UTC time as the second UTC time.

10. The method according to claim 7, further comprising:

determining whether the display apparatus is connected to a network; based on that the display apparatus is connected to a network, obtaining a third UTC time from a server; detecting whether the third UTC time is successfully obtained; and based on that the third UTC time is successfully obtained, setting the third UTC time as the second UTC time;

based on that the display apparatus is not connected to a network, or the third UTC time is not successfully obtained, setting a locally stored fourth UTC time as the second UTC time.

\* \* \* \* \*